(12) United States Patent
Zhang et al.

(10) Patent No.: US 11,785,120 B2
(45) Date of Patent: Oct. 10, 2023

(54) DATA TRANSMISSION METHOD AND RELATED APPARATUS

(71) Applicant: Huawei Technologies Co., Ltd., Shenzhen (CN)

(72) Inventors: Bo Zhang, Shenzhen (CN); Qiujie Fu, Nanjing (CN); Zhigang Huang, Grenoble (FR); Fangzhou Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 17/375,806

(22) Filed: Jul. 14, 2021

(65) Prior Publication Data
US 2021/0344781 A1 Nov. 4, 2021

Related U.S. Application Data

(63) Continuation of application No. PCT/CN2019/123844, filed on Dec. 7, 2019.

(30) Foreign Application Priority Data

Jan. 14, 2019 (CN) .......................... 201910032493.X

(51) Int. Cl.
*H04L 1/18* (2023.01)
*H04L 69/18* (2022.01)
(Continued)

(52) U.S. Cl.
CPC ............ *H04L 69/18* (2013.01); *H04L 1/0029* (2013.01); *H04L 1/1809* (2013.01); *H04L 5/0055* (2013.01); *H04L 69/02* (2013.01)

(58) Field of Classification Search
CPC ... H04L 1/0029; H04L 1/1607; H04L 1/1809; H04L 1/1829; H04L 1/1864;
(Continued)

(56) References Cited

U.S. PATENT DOCUMENTS 9,143,450 B2 * 9/2015 Chen ..................... H04L 47/283
9,907,112 B2 * 2/2018 Pang ..................... H04W 80/04
(Continued)

FOREIGN PATENT DOCUMENTS

CN 101426004 A 5/2009
CN 102186207 A 9/2011
(Continued)

OTHER PUBLICATIONS

Huawei, TP for the solutions of TCP optimization, 3GPP TSG-RAN3 Meeting #94, R3-162871,2 pages, Nov. 18, 2016.*
(Continued)

*Primary Examiner* — Frank Duong
(74) *Attorney, Agent, or Firm* — Leydig, Voit & Mayer, Ltd.

(57) ABSTRACT

A data transmission method and an apparatus are provided. The method includes: when determining that a first data stream satisfies a transmission optimization enabling condition, a first transmitting end TE1 sends a transmission optimization enabling notification to a first receiving end RE1, where the transmission optimization enabling notification is used to indicate the RE1 to skip sending, to the TE1, an acknowledgment packet used to acknowledge that a data packet of the first data stream is already received by the RE2. The TE1 receives a data packet Data2 in a second protocol format from the TE2. The TE1 sends a data packet Data1 in a first protocol format to the RE1. The TE1 receives an acknowledgment frame Ack1 in the first protocol format from the RE1. The TE1 constructs an acknowledgment packet Ack2 in the second protocol format based on the Ack1, and sends it to the TE2.

16 Claims, 10 Drawing Sheets

(51) Int. Cl.
*H04L 1/00* (2006.01)
*H04L 1/1809* (2023.01)
*H04L 5/00* (2006.01)
*H04L 69/00* (2022.01)

(58) Field of Classification Search
CPC ..... H04L 1/1867; H04L 5/0055; H04L 69/02; H04L 69/08; H04L 69/16; H04L 69/18; H04L 2001/0097
See application file for complete search history.

(56) References Cited

U.S. PATENT DOCUMENTS

| | | | |
|---|---|---|---|
| 2003/0235206 A1* | 12/2003 | Heller | H04L 47/193 370/467 |
| 2005/0141455 A1* | 6/2005 | Kim | H04L 69/16 455/436 |
| 2006/0107168 A1 | 5/2006 | Chang | |
| 2017/0070437 A9 | 3/2017 | Patel et al. | |
| 2019/0174356 A1* | 6/2019 | Lin | H04L 47/27 |
| 2019/0223256 A1* | 7/2019 | Lin | H04L 1/18 |

FOREIGN PATENT DOCUMENTS

| | | |
|---|---|---|
| CN | 102355462 A | 2/2012 |
| CN | 103618667 A | 3/2014 |
| CN | 104995950 A | 10/2015 |
| CN | 109525374 A | 3/2019 |
| EP | 3151608 A1 | 4/2017 |
| WO | 2018027814 A1 | 2/2018 |

OTHER PUBLICATIONS

ETSI TR 136 933 V14.0.0, LTE; Study on Context Aware Service Delivery in RAN for LTE (3GPP TR 36.933 version 14.0.0 Release 14), 20 pages, Apr. 2017.*

Huawei, "Discussion on the solution of TCP optimization," 3GPP TSG-RAN3 Meeting #94, Reno, Nevada, USA, R3-162870, total 6 pages, 3rd Generation Partnership Project, Valbonne, France (Nov. 14-18, 2016).

* cited by examiner

DATA TRANSMISSION METHOD AND RELATED APPARATUS

CROSS-REFERENCE TO RELATED APPLICATIONS

This application is a continuation of International Application No. PCT/CN2019/123844, filed on Dec. 7, 2019, which claims priority to Chinese Patent Application No. 201910032493.X, filed on Jan. 14, 2019. The disclosures of the aforementioned applications are hereby incorporated by reference in their entireties.

TECHNICAL FIELD

Embodiments of this application relate to the field of data transmission technologies, and in particular, to a data transmission method and a related apparatus.

BACKGROUND

With continuous development of network technologies, a network has become an important part of people's life. To adapt to various network data transmission scenarios, use of a plurality of protocols to transmit various network data becomes a widely used data transmission manner.

In a transmission manner, a packet of an upper-layer protocol may be encapsulated in a data frame of a lower-layer protocol for transmission. Both the upper-layer protocol and the lower-layer protocol may use transmission mechanisms in which acknowledgment needs to be performed. When the lower-layer protocol uses a transmission mechanism in which acknowledgment needs to be performed, a receiving end needs to acknowledge reception of each data frame of the lower-layer protocol. When the upper-layer protocol uses a transmission mechanism in which acknowledgment needs to be performed, the receiving end needs to acknowledge reception of each data frame of the upper-layer protocol.

When both the upper-layer protocol and the lower-layer protocol use transmission mechanisms in which acknowledgment needs to be performed, for each packet of the upper-layer protocol, the receiving end actually needs to acknowledge reception of the packet of the upper-layer protocol and a data frame that is of the lower-layer protocol and in which the packet of the upper-layer protocol is encapsulated, thereby resulting in relatively low transmission efficiency.

SUMMARY

This application provides a data transmission method and a related apparatus, to improve transmission efficiency.

According to a first aspect, this application provides a data transmission method, and the method includes:

When determining that a first data stream satisfies a transmission optimization enabling condition, a first transmitting end TE1 sends a transmission optimization enabling notification to a first receiving end RE1, where the first data stream is sent by a second transmitting end TE2 to a second receiving end RE2, the transmission optimization enabling notification is used to indicate the RE1 to skip sending, to the TE1, an acknowledgment packet used to acknowledge that a data packet of the first data stream is already received by the RE2, and the RE2 is the RE1, or the RE2 is a device communicating with the TE1 through the RE1.

The TE1 receives a data packet Data2 that is in a second protocol format and that is sent by the TE2, where the Data2 belongs to the first data stream.

The TE1 sends a data frame Data1 in a first protocol format to the RE1, where the Data2 is encapsulated in the Data1.

The TE1 receives an acknowledgment frame Ack1 that is in the first protocol format and that is sent by the RE1, where the Ack1 is used to acknowledge that the Data1 is already received by the RE1.

The TE1 constructs an acknowledgment packet Ack2 in the second protocol format based on the Ack1, and sends the Ack2 to the TE2, where the Ack2 is used to acknowledge that the Data2 is already received by the RE2.

According to the technical solution provided in this application, after receiving the acknowledgment frame used to acknowledge that the data frame in the first protocol format is already received by the RE1, the TE1 may determine, based on the acknowledgment frame, information about a data packet that is in the first protocol format and that is encapsulated in the data frame, and may further construct the acknowledgment packet used to acknowledge that the data packet of the second protocol format is already received by the RE2, and send the constructed acknowledgment packet of the data packet to the TE2. In this way, after receiving the acknowledgment frame, the TE1 may construct the acknowledgment packet used to acknowledge that the data packet is already received by the RE2, and send the acknowledgment packet to the TE2, without waiting for the RE1 to send the acknowledgment packet of the data packet to the TE1 after the RE1 sends the acknowledgment frame. The TE1 may also construct the acknowledgment packet and send the acknowledgment packet to the TE2, to complete a retransmission acknowledgment mechanism. Therefore, the TE1 can send the acknowledgment packet in the second protocol format to the TE2 earlier, and the TE2 can then start to send a subsequent packet in the second protocol format earlier, so that data transmission efficiency can be improved. In addition, in this way, an amount of data to be transmitted through a wireless connection between the TE1 and the RE1 can be further reduced, thereby improving performance of data transmission between the TE1 and the RE1.

In a possible implementation, before that the TE1 receives an acknowledgment frame Ack1 that is in the first protocol format and that is sent by the RE1, the method further includes: The TE1 buffers packet header information of the Data2.

That the TE1 constructs an acknowledgment packet Ack2 in the second protocol format based on the Ack1 includes: The TE1 obtains the buffered Data2 based on the Ack1, and constructs the Ack2 based on the packet header information of the buffered Data2.

In a possible implementation, the transmission optimization enabling condition includes at least one of the following:

a transmission index of the first data stream is less than a preset transmission index threshold, where the transmission index includes at least one of the following: a sending rate and a packet loss rate; and a streaming service type of the first data stream is a multimedia stream.

In a possible implementation, the RE2 is the device communicating with the TE1 through the RE1, and the transmission optimization enabling notification is used to indicate the RE1 to send, after the RE1 receives the data packet of the first data stream, the Data2 encapsulated in the Data1 to the RE2, and to skip sending an acknowledgment packet Ack3 to the TE1 when the RE1 receives the Ack3 that is in the second protocol format and that is sent by the RE2, where the Ack3 is used to acknowledge that the Data2 is already received by the RE2.

In a possible implementation, when determining that the first data stream meets the transmission optimization enabling condition, and before the first transmitting end TE1 sends the transmission optimization enabling notification to the first receiving end RE1, the method further includes:

The TE1 determines whether transmission reliability between the RE1 and the RE2 satisfies a reliability requirement; and if the transmission reliability satisfies the reliability requirement, the TE1 performs a step of sending the transmission optimization enabling notification to the RE1 when determining that the first data stream satisfies the transmission optimization enabling condition.

For example, that the parameter of the transmission reliability satisfies the reliability requirement includes one or a combination of the following conditions: a packet loss rate of transmission between the RE1 and the RE2 is less than a preset packet loss rate threshold, a length of a wired communication link between the RE1 and the RE2 is less than a preset length threshold, and a wireless communication distance between the RE1 and the RE2 is less than a preset distance threshold.

In a possible implementation, the first protocol is a wireless local area network WLAN protocol, and the second protocol is a connection-oriented transmission protocol. For example, the second protocol may be a TCP protocol.

In a possible implementation, the TE2 is a network device, and the TE1 is a gateway device.

When the RE2 is the RE1, the RE1 is user equipment, or when the RE2 is the device communicating with the TE1 through the RE1, the RE2 is user equipment, and the RE1 is a transmission device.

For example, the network device may be a server, the gateway device may be a home gateway, and the transmission device may be an access point AP.

According to a second aspect, this application provides a data transmission method, and the method includes:

A receiving end RE0 receives a transmission optimization enabling notification sent by a first transmitting end TE1, where the transmission optimization enabling notification is used to indicate the RE0 to skip sending, to the TE1 when the RE0 receives a data packet of a first data stream, a corresponding acknowledgment packet used to acknowledge that the data packet of the first data stream is already received by the RE0.

The RE0 receives a data frame Data1 that is in a first protocol format and that is sent by the TE1, where a data packet Data2 in a second protocol format is encapsulated in the Data1, and the Data2 belongs to the first data stream.

The RE0 sends an acknowledgment frame Ack1 in the first protocol format to the TE1, where the Ack1 is used to acknowledge that the Data1 is already received by the RE0.

The RE0 skips sending an acknowledgment packet Ack3 in the second protocol format to the TE1 based on the transmission optimization enabling notification, where the Ack3 is used to acknowledge that the Data2 is already received by the RE0.

In a possible implementation, the RE0 includes a first receiving end RE1 and a second receiving end RE2, and the first data stream is sent by a TE2 to the RE2; and the Ack3 is used to acknowledge that the Data2 is already received by the RE2.

That the RE0 receives a data frame Data1 that is in a first protocol format and that is sent by the TE1 includes: The RE1 receives the Data1 sent by the TEL After that the RE1 receives the Data1 sent by the TE1, the method further includes: The RE1 sends the Data2 to the RE2; and the RE1 receives the Ack3 sent by the RE2.

That the RE0 skips sending, an acknowledgment packet Ack3 in the second protocol format to the TE1 based on the transmission optimization enabling notification includes: The RE1 discards the Ack3.

The method further includes:

The RE1 receives a data frame Data3 that is in the first protocol format and that is sent by the TE1, where a data packet Data4 in the second protocol format is encapsulated in the Data3, and the Data4 belongs to the first data stream.

The RE1 sends the Data4 to the RE2, and the RE1 sends a connection interruption instruction when the RE1 detects that the Data4 is not received by the RE2, where the connection interruption instruction is used to instruct to disconnect a second protocol-based communication connection between the RE2 and the TE2.

In a possible implementation, the TE1 is a gateway device, and the TE2 is a network device. For example, the gateway device may be a home gateway, and the network device may be a server.

In an example, the RE0 is user equipment, the RE1 is a first protocol module of the user equipment, for example, a WLAN module, and the RE2 is a second protocol module of the user equipment, for example, a TCP module. Correspondingly, the RE1 may communicate with the RE2 based on a bus inside a device. Alternatively, in another example, the RE1 is a transmission device, and the RE2 is user equipment. For example, the transmission device may be an access point AP. Correspondingly, the RE1 may communicate with the RE2 based on a wired communication link.

According to a third aspect, this application provides a data transmission method, and the method includes:

A first receiving end RE1 receives a transmission optimization enabling notification sent by a first transmitting end TE1, where the transmission optimization enabling notification is used to indicate the RE1 to skip sending, to the TE1, an acknowledgment packet used to acknowledge that a data packet of a first data stream is already received by a second receiving end RE2, and the first data stream is sent by a second transmitting end TE2 to the RE2.

The RE1 receives a data frame Data1 that is in a first protocol format and that is sent by the TE1, where a data packet Data2 in a second protocol format is encapsulated in the Data1, and the Data2 belongs to the first data stream.

The RE1 sends the Data2 to the RE2.

The RE1 skips sending an acknowledgment packet Ack3 to the TE1 based on the transmission optimization enabling notification, when the RE1 receives the Ack3 that is in the second protocol format and that is sent by the RE2, where the Ack3 is used to acknowledge that the Data2 is already received by the RE2.

In a possible implementation, that the RE1 skips sending an Ack3 to the TE1 based on the transmission optimization enabling notification includes: The RE1 discards the Ack3.

In a possible implementation, after that the RE1 sends the Data2 to the RE2, the method further includes:

The RE1 receives a data frame Data3 that is in the first protocol format and that is sent by the TE1, where a data packet Data4 in the second protocol format is encapsulated in the Data3, and the Data4 belongs to the first data stream.

The RE1 sends the Data4 to the RE2, and the RE1 sends a connection interruption instruction to the RE2 or the TE2 when the RE1 detects that the Data4 is not received by the RE2, where the connection interruption instruction is used to instruct to disconnect a second protocol-based communication connection between the RE2 and the TE2.

In a possible implementation, that the RE1 detects that the Data4 is not received by the RE2 includes:

The RE1 receives a packet loss indication sent by the RE2, or the RE1 fails to receive, within a preset time, an acknowledgment packet used to acknowledge that the Data4 is already received by the RE2.

In a possible implementation, that the RE1 sends a connection interruption instruction to the RE2 or the TE2 includes at least one of the following:

The RE1 sends a first interruption instruction to the RE2, where the first interruption instruction is used to instruct the RE2 to send, to the TE2, a request for interrupting the second protocol-based communication connection; and the RE1 sends a second interruption instruction to the TE2, where the second interruption instruction is used to instruct the TE2 to send, to the RE2, a request for interrupting the second protocol-based communication connection.

In a possible implementation, the TE1 is a gateway device, and the TE2 is a network device. The RE1 is a transmission device, and the RE2 is user equipment. For example, the gateway device may be a home gateway, the network device may be a server, and the transmission device may be an access point AP.

In a possible implementation, after the RE1 receives the Data1 sent by the first transmitting end TE1, the method further includes: The RE1 sends the Data2 to the RE2; and the RE1 buffers the Data2.

After that the RE1 sends the Data2 to the RE2, the method further includes:

The RE1 sends the buffered Data2 to the RE2 if the RE1 receives a packet loss indication sent by the RE2, or the RE1 fails to receive an acknowledgment packet Ack3 in the second protocol format within the preset time, where the Ack3 is used to acknowledge that the Data2 is already received by the RE2.

According to a fourth aspect, this application provides a data transmission apparatus. The apparatus is located at a first transmitting end TE1 and includes:

a processing module, configured to: when determining that a first data stream satisfies a transmission optimization enabling condition, send a transmission optimization enabling notification to a first receiving end RE1 by using a sending module, where the first data stream is sent by a second transmitting end TE2 to a second receiving end RE2, the transmission optimization enabling notification is used to indicate the RE1 to skip sending, to the TE1, an acknowledgment packet used to acknowledge that a data packet of the first data stream is already received by the RE2, and the RE2 is the RE1 or the RE2 is a device communicating with the TE1 through the RE1;

a receiving module, configured to: receive a data packet Data2 that is in a second protocol format and that is sent by the TE2, where the Data2 belongs to the first data stream; and receive an acknowledgment frame Ack1 that is in a first protocol format and that is sent by the RE1, where the Ack1 is used to acknowledge that a data frame Data1 in the first protocol format is already received by the RE1; and the sending module, configured to: send the Data1 to the RE1 when the receiving module receives the Data2, where the Data2 is encapsulated in the Data1; and when the receiving module receives the Ack1, construct an acknowledgment packet Ack2 in the second protocol format based on the Ack1, and send the Ack2 to the TE2, where the Ack2 is used to acknowledge that the Data2 is already received by the RE2.

According to a fifth aspect, this application provides a data transmission apparatus. The apparatus is located at a receiving end RE0 and includes:

a receiving module, configured to: receive a transmission optimization enabling notification sent by a first transmitting end TE1, where the transmission optimization enabling notification is used to indicate the RE0 to skip sending, to the TE1 when the RE0 receives a data packet of a first data stream, a corresponding acknowledgment packet used to acknowledge that the data packet of the first data stream is already received by the RE0; and receive a data frame Data1 that is in a first protocol format and that is sent by the TE1, where a data packet Data2 in a second protocol format is encapsulated in the Data1, and the Data2 belongs to the first data stream;

a sending module, configured to send an acknowledgment frame Ack1 in the first protocol format to the TE1 when the receiving module receives the Data1, where the Ack1 is used to acknowledge that the Data1 is already received by the RE0; and a processing module, configured to skip sending, an acknowledgment packet Ack3 in the second protocol format to the TE1 based on the transmission optimization enabling notification, where the Ack3 is used to acknowledge that the Data2 is already received by the RE0.

According to a sixth aspect, this application provides a data transmission apparatus. The apparatus is located on a side of a first receiving end RE1 and includes:

a receiving module, configured to: receive a transmission optimization enabling notification sent by a first transmitting end TE1, where the transmission optimization enabling notification is used to indicate the RE1 to skip sending, to the TE1, an acknowledgment packet used to acknowledge that a data packet of a first data stream is already received by a second receiving end RE2, and the first data stream is sent by a second transmitting end TE2 to the RE2; and receive a data frame Data1 that is in a first protocol format and that is sent by the TE1, where a data packet Data2 in a second protocol format is encapsulated in the Data1, and the Data2 belongs to the first data stream;

a sending module, configured to send the Data2 to the RE2 when the sending module receives the Data1; and a processing module, configured to: when the receiving module receives an acknowledgment packet Ack3 that is in the second protocol format and that is sent by the RE2, skip sending the Ack3 to the TE1 based on the transmission optimization enabling notification, where the Ack3 is used to acknowledge that the Data2 is already received by the RE2.

According to a seventh aspect, this application provides a gateway device, including:

one or more processors; and a storage apparatus, configured to store one or more programs.

When the one or more programs are executed by the one or more processors, the one or more processors are enabled to implement the data transmission method in the first aspect. For example, the gateway device may perform the steps performed by the TE1 in the first aspect to the third aspect.

For example, the gateway device may be a wireless access point.

According to an eighth aspect, this application provides user equipment, including:

one or more processors; and a storage apparatus, configured to store one or more programs.

When the one or more programs are executed by the one or more processors, the one or more processors are enabled to implement the data transmission method in the second aspect. For example, the user equipment may perform the steps performed by the RE0 in the first aspect to the third aspect, or the user equipment may perform the steps performed by the RE2 in the first aspect to the third aspect.

According to a ninth aspect, this application provides a transmission device, including:
one or more processors; and
a storage apparatus, configured to store one or more programs.

When the one or more programs are executed by the one or more processors, the one or more processors are enabled to implement the data transmission method in the third aspect. For example, the transmission device may perform the steps performed by the RE1 in the first aspect to the third aspect.

For example, the transmission device may be an access point AP.

According to a tenth aspect, this application provides a computer-readable storage medium. The computer-readable storage medium stores an instruction, and when the instruction is run on a computer, the computer-readable storage medium is configured to perform the data transmission method according to any one of the first aspect to the third aspect.

According to an eleventh aspect, this application provides a computer program, and when computer program is executed by a computer, the computer program is configured to perform the data transmission method according to any one of the first aspect to the third aspect.

DESCRIPTION OF EMBODIMENTS

Terms used in implementations of this application are merely used to explain specific embodiments of this application, but are not intended to limit this application.

The following describes a data transmission method provided in this application by using an example in which a lower-layer protocol is a first protocol and an upper-layer protocol is a second protocol.

A network architecture of the data transmission method provided in this application is first described below as an example.

Figure 1:
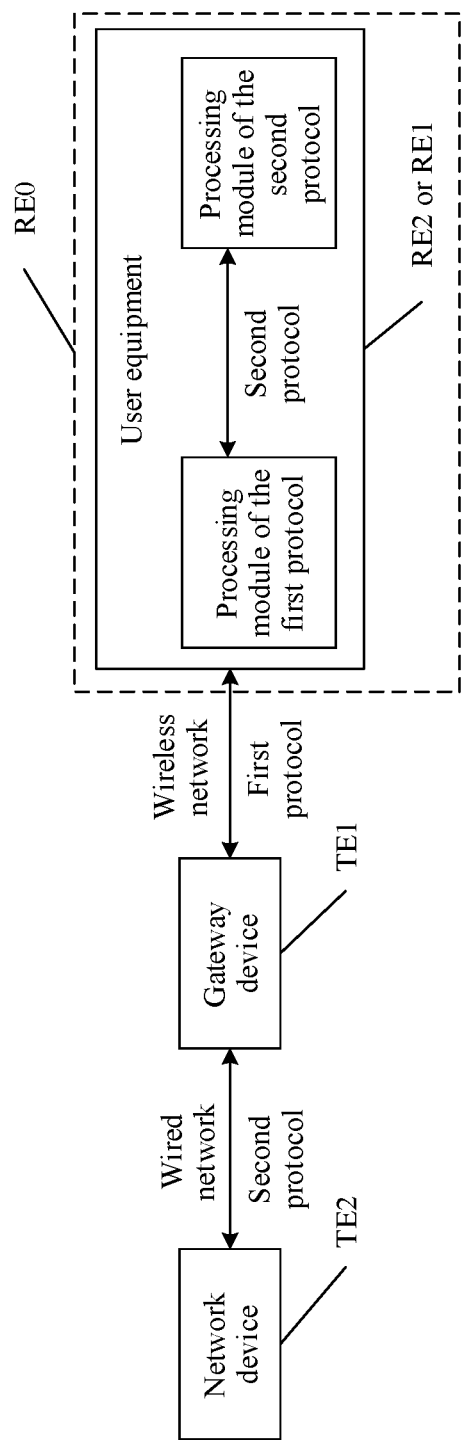
FIG. 1 is a schematic diagram of a network architecture according to an embodiment of this application.
Figure 2:
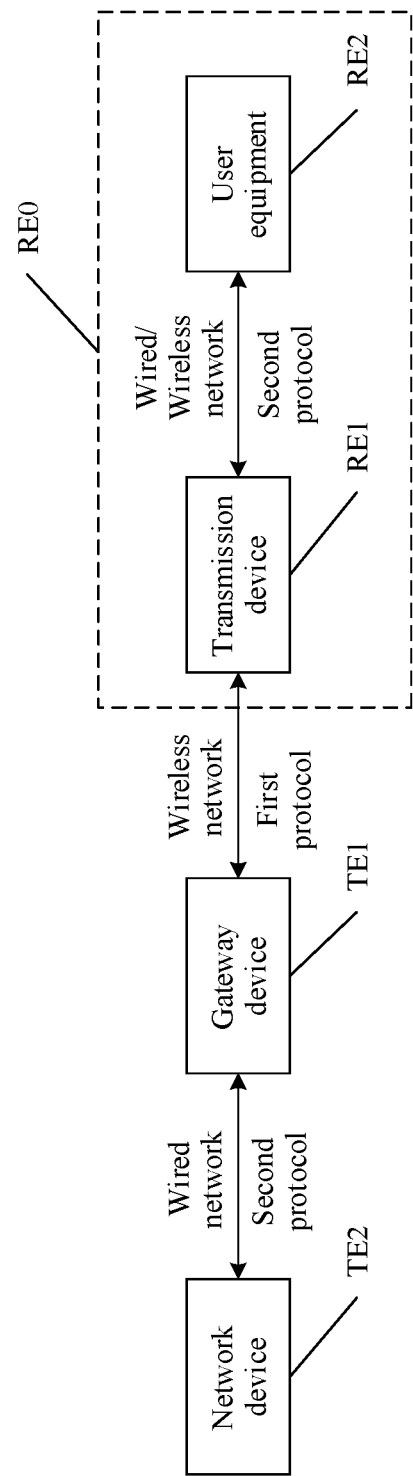
FIG. 2 is a schematic diagram of another network architecture according to an embodiment of this application.

FIG. 1 is a schematic diagram of a network architecture according to an embodiment of this application. FIG. 2 is a schematic diagram of another network architecture according to an embodiment of this application.

The network architecture shown in FIG. 1 may include a network device, a gateway device, and user equipment. The network device and the user equipment may communicate with each other based on the second protocol. The network device may send a packet in a second protocol format to the gateway device, and the gateway device may encapsulate the packet that is in the second protocol format and that is received from the network device in a data frame in a first protocol format, and send the data frame in the first protocol format to the user equipment. The user equipment may include a processing module of the first protocol and a processing module of the second protocol. After receiving the data frame that is in the first protocol format and that is sent by the gateway device, the processing module of the first protocol may send an acknowledgment frame in the first protocol format to the gateway device, and the processing module of the first protocol may further parse the received data frame in the first protocol format to obtain the packet in the second protocol format, and send the packet in the second protocol format to the processing module of the second protocol for processing. In another embodiment of this application, the processing module of the first protocol may also be referred to as a first protocol module or a lower-layer protocol module, and the processing module of the second protocol may also be referred to as a second protocol module or an upper-layer protocol module.

The network architecture shown in FIG. 2 may include a network device, a gateway device, a transmission device, and user equipment. The network device and the user equipment may communicate with each other based on the second protocol. The network device may send a packet in a second protocol format to the gateway device, and the gateway device may encapsulate the packet that is in the second protocol format and that is received from the network device in a data frame in a first protocol format, and send the data frame in the first protocol format to the transmission device. After receiving the data frame that is in the first protocol format and that is sent by the gateway device, the transmission device may send an acknowledgment frame in the first protocol format to the gateway device, and then the transmission device may parse the received data frame in the first protocol format to obtain the packet in the second protocol format, and send the packet in the second protocol format to the user equipment for processing.

It may be learned that the network device in FIG. 1 and FIG. 2 is a transmitting end of the packet in the second protocol format, the gateway device in FIG. 1 and FIG. 2 is a transmitting end of the data frame in the first protocol format, the user equipment in FIG. 1 is a receiving end of the data frame in the first protocol format and the packet in the second protocol format, the transmission device in FIG. 2 is a receiving end of the data frame in the first protocol format, and the user equipment in FIG. 2 is a receiving end of the packet in the second protocol format. A processing process performed by the transmission device in FIG. 2 is similar to a processing process performed by the processing module of the first protocol in FIG. 1, and a processing process performed by the user equipment in FIG. 2 is similar to a processing process performed by the processing module of the second protocol in FIG. 1.

In this application, on a transmitting side, a transmitter of the data frame in the first protocol format in FIG. 1 and FIG. 2 may be referred to as a first transmitting end TE1, and a transmitter of the packet in the second protocol format may be referred to as a second transmitting end TE2. To be specific, the TE2 may be the network device in FIG. 1 and FIG. 2, and the TE1 may be the gateway device in FIG. 1 and FIG. 2. On a receiving side, a receiver of the data frame in the first protocol format may be referred to as a first receiving end RE1, and a receiver of the packet in the second protocol format may be referred to as a second receiving end RE2. It should be noted that, in the network architecture shown in FIG. 1, the receiver of the data frame in the first protocol format and the receiver of the packet in the second protocol format are a same device. To be specific, the RE2 may be the RE1, and the RE2 and the RE1 may be the user equipment in FIG. 1. In the network architecture shown in FIG. 2, the receiver of the data frame in the first protocol format and the receiver of the packet in the second protocol format are different devices, and the RE2 needs to communicate with the TE1 through the RE1. To be specific, the RE2 may be a device communicating with the TE1 through the RE1, the RE1 may be the transmission device in FIG. 2, and the RE2 may be the user equipment in FIG. 2.

In this embodiment of this application, a receiving end of the packet in the first protocol format and a receiving end of the data frame in the second protocol format may be collectively referred to as an RE0. A transmitting end of the packet in the first protocol format and a transmitting end of the data frame in the second protocol format may be collectively referred to as a TE0.

An interaction procedure in which the TE2 sends a data packet of a data stream to the RE2 through the TE1 and the RE1 is described below as an example. It should be noted that, corresponding to the network architecture shown in FIG. 1, all steps performed by an RE1 in a method shown in FIG. 3 may be performed by an RE2, to be specific, the user equipment in FIG. 1.

Figure 3:
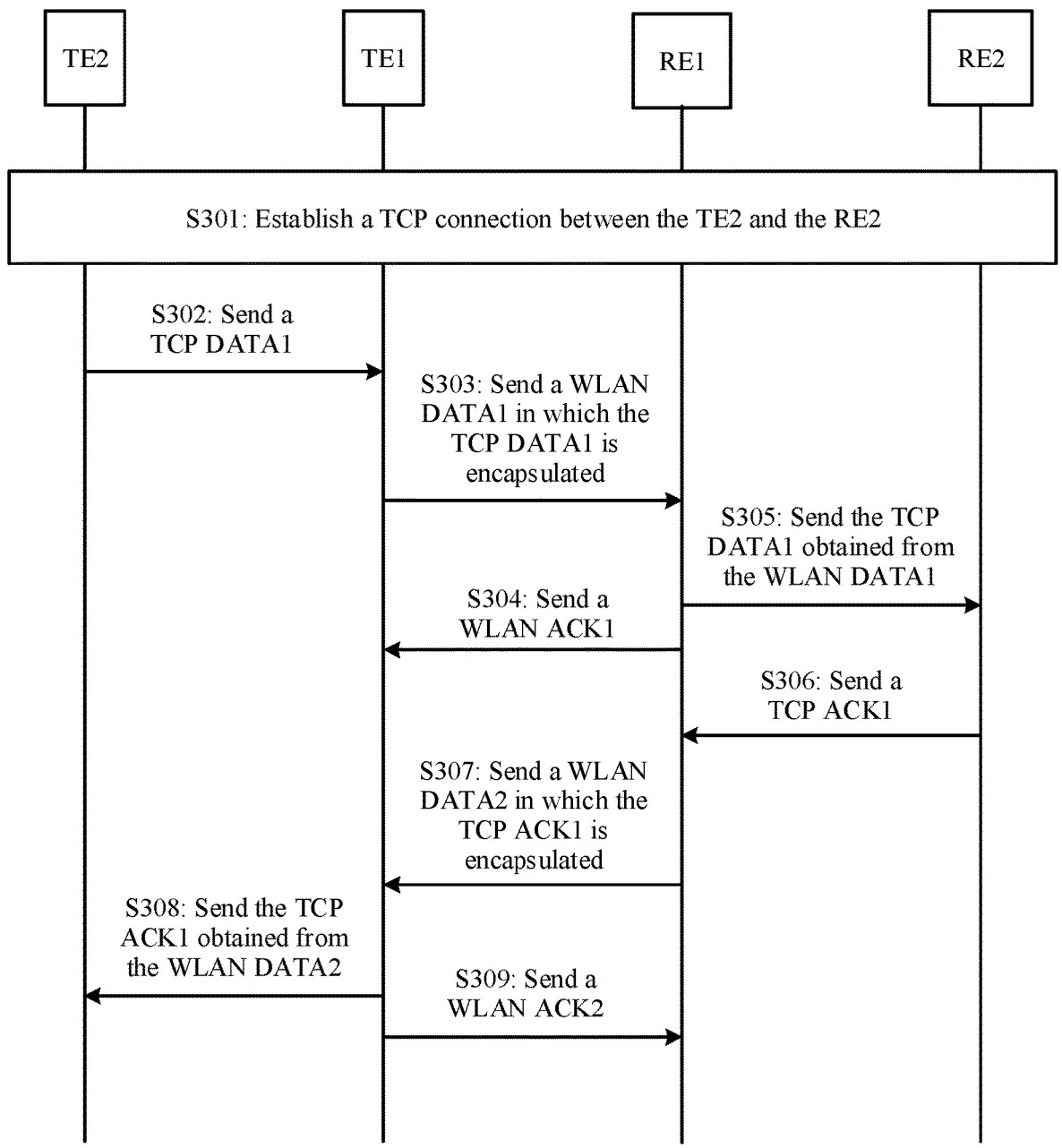
FIG. 3 is a schematic diagram of an interaction procedure of a data transmission method.

FIG. 3 is a schematic diagram of an interaction procedure of a data transmission method. For example, communication connections are separately established between a TE2 and a TE1 and between the TE1 and an RE1. The TE1 communicates with the RE1 based on a first protocol, and the TE2 communicates with an RE2 based on a second protocol. For example, the first protocol may be a wireless local area network WLAN) protocol, and the second protocol may be a transmission control protocol (TCP). As shown in FIG. 3, the method may include the following steps.

S301: The TE2 establishes a TCP connection with the RE2.

A TCP retransmission acknowledgment mechanism may be enabled between the TE2 and the RE2. In an example, to ensure data transmission reliability, a quantity of retransmission times may not be limited in the retransmission acknowledgment mechanism.

S302: The TE2 sends a TCP DATA1 to the TE1.

The TCP DATA1 is a data packet of the TCP protocol.

S303: The TE1 sends, to the RE1, WLAN DATA1 in which the TCP DATA1 is encapsulated.

The WLAN DATA1 is a data frame of the WLAN protocol. The TE1 sends the WLAN DATA1 to the RE1 after encapsulating the TCP DATA1 in the WLAN DATA1.

S304: The RE1 sends a WLAN ACK1 to the TE1.

In an acknowledgment mechanism at a MAC layer, the RE1 needs to send a WLAN acknowledgment frame to the TE1 after receiving a WLAN data frame sent by the TEL In an example, the WLAN acknowledgment frame may be an acknowledgment (ACK) frame for acknowledging a single WLAN data frame. In another example, the RE1 may alternatively acknowledge the received WLAN data frame by using a block acknowledgment (BA) frame, and the RE1 may acknowledge, by using one BA frame, that a plurality of WLAN data frames are received. Herein, the WLAN ACK1 is an ACK frame for the WLAN DATA1, or the WLAN ACK1 is a BA frame for a plurality of WLAN data frames including the WLAN DATA1. In this application, a retransmission acknowledgment mechanism at the MAC layer may have a limited quantity of times. If the TE1 fails to receive a BA frame from the RE1 or the BA frame has an error within a specific quantity of retransmission times, the TE1 retransmits the data frame to the RE1. If a maximum quantity of retransmission times is reached but the data frame still fails to be transmitted, the TE1 gives up transmitting the data frame. The retransmission acknowledgment mechanism at the MAC layer can increase a probability of successful data transmission between the RE1 and the TE1, but cannot ensure reliability.

S305: The RE1 sends, to the RE2, the TCP DATA1 obtained from the WLAN DATA1.

The RE1 decapsulates the received WLAN DATA1 to obtain the TCP DATA1, and sends the obtained TCP DATA1 to the RE2. For example, the RE1 may obtain the TCP DATA1 packet after removing a WLAN header.

S306: The RE2 sends a TCP ACK1 to the RE1.

In an acknowledgment mechanism at a TCP layer, the RE2 needs to send a TCP acknowledgment packet to the RE1 after receiving a TCP data packet sent by the RE1. Herein, the TCP ACK1 is an acknowledgment packet for the TCP DATA1. The TCP ACK1 includes an acknowledgment number and a receive window value, and usually further includes option information such as a timestamp. The acknowledgment number may be used to indicate a sequence number of a TCP packet currently received by a receiving end (RE2) of the TCP packet. In an example, the acknowledgment number may be a sequence number of a next TCP packet expected to be received. The receive window value may be used to indicate a size of data that is allowed to be received in a current buffer of the receiving end of the TCP packet. When receiving the receive window value, a transmitting end (TE2) of the TCP packet may determine a quantity of bytes of the TCP packet that is allowed to be sent. The timestamp may be used to indicate an actual time at which the RE2 receives the TCP packet, and the time may be used to calculate information such as an RTT between the TE2 and the RE2. In another embodiment of this application, the TCP ACK1 may further include the option information. In an example, an option may be used to indicate some parameters related to user experience at the TCP layer. This is not limited in this application.

S307: The RE1 sends, to the TE1, WLAN DATA2 in which the TCP ACK1 is encapsulated.

The RE1 encapsulates the TCP ACK1 received from the RE2, to obtain the WLAN DATA2. For example, the RE1 carries the WLAN header in the TCP ACK1 to obtain the WLAN data frame WLAN DATA2. In this application, when various packets at the TCP layer are transmitted according to the WLAN protocol, both a data packet and an acknowledgment packet at the TCP layer may be encapsulated in a WLAN data frame for sending.

S308: The TE1 sends, to the TE2, the TCP ACK1 obtained from the WLAN DATA2.

The TE1 decapsulates the received WLAN DATA2 to obtain the TCP ACK1, and sends the obtained TCP ACK1 to the TE2. For example, the TE1 obtains the TCP ACK1 packet after removing the WLAN header from the WLAN DATA2, and sends the TCP ACK1 packet to the TE2.

S309: The TE1 sends a WLAN ACK2 to the RE1.

The WLAN ACK2 is an ACK frame for the WLAN DATA2, or the WLAN ACK2 is a BA frame for a plurality of WLAN data frames including the WLAN DATA2.

It should be noted that S304 and S305 may be performed simultaneously or may not be performed simultaneously, and S308 and S309 may be performed simultaneously or may not be performed simultaneously.

It may be learned from the foregoing procedure that, when both the first protocol and the second protocol are transmission protocols that require an acknowledgment mechanism, for each data packet of a second protocol format in a data stream that is sent by the TE2 to the RE2 through the TE1 and the RE1, the RE1 actually needs to separately send an acknowledgment message of the first protocol and an acknowledgment message of the second protocol to the TE1, as shown in S304 and S309 in FIG. 3. This may cause problems such as congestion on a data transmission channel between the RE1 and the TE1 and a waste of transmission resources.

To resolve the foregoing problem, this application provides a data transmission method.

Figure 4:
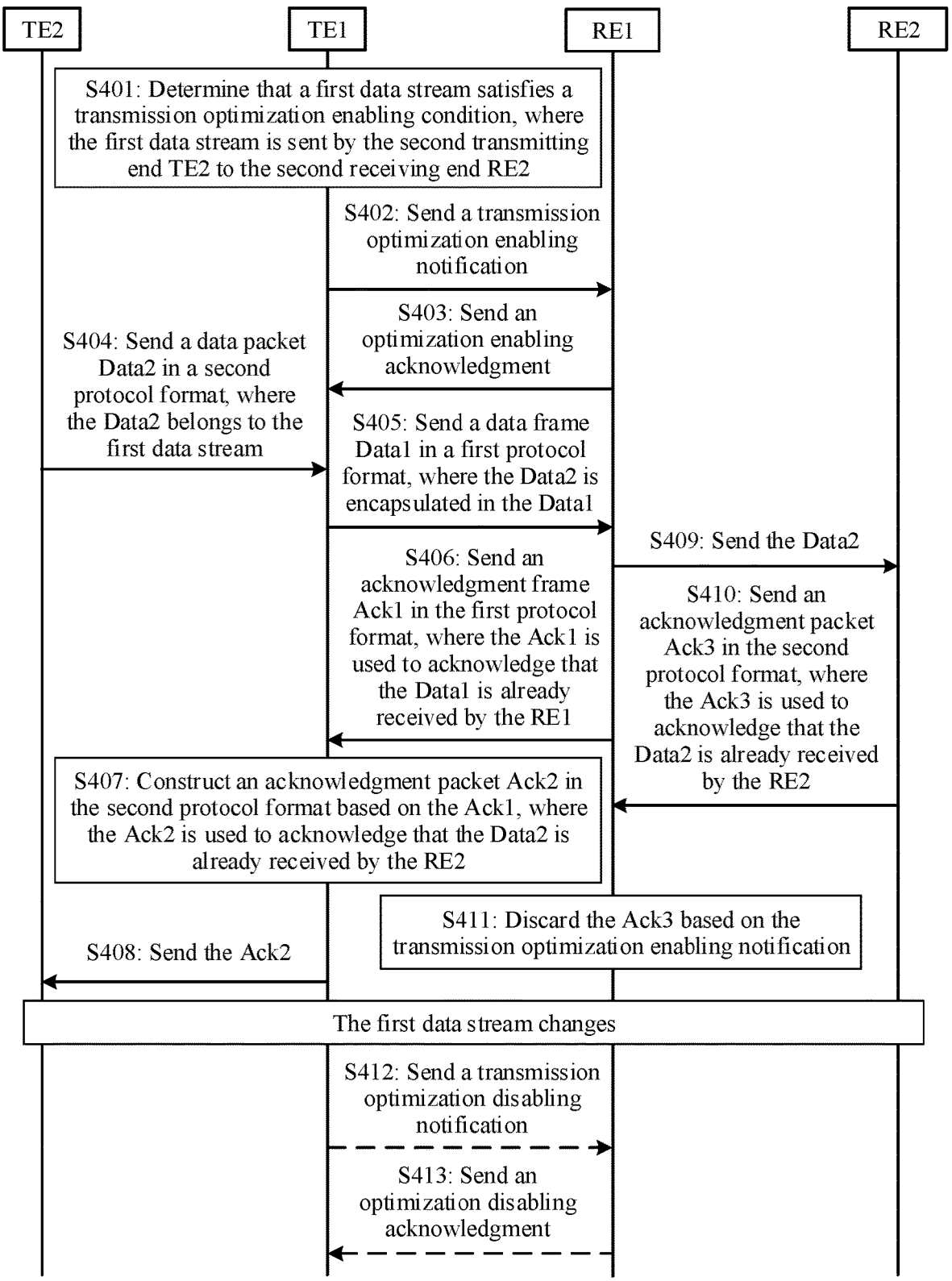
FIG. 4 is an interaction flowchart 1 of a data transmission method according to this application.

FIG. 4 is an interaction flowchart 1 of a data transmission method according to this application. This embodiment of this application relates to a TE1, a TE2, an RE1, and an RE2. It should be noted that the RE1 and the RE2 may be collectively referred to as an RE0, and the RE0 may perform steps performed by the RE1 and the RE2. As shown in FIG. 4, this embodiment of this application includes the following steps.

S401: The TE1 determines that a first data stream satisfies a transmission optimization enabling condition, where the first data stream is sent by the TE2 to the RE2.

In this embodiment of this application, the TE1 may determine whether the first data stream satisfies the transmission optimization enabling condition. The transmission optimization enabling condition may include at least one type of the following information. In an example, a transmission index of the first data stream is less than a preset transmission index threshold, and the transmission index may include at least one of the following: a sending rate, a packet loss rate, and a transmission delay. In another example, a streaming service type of the first data stream is a multimedia stream. For example, the multimedia stream may be an audio stream, a video stream, or a VR stream. For example, it may be specified that when a data stream is a video stream, the TE1 determines that the data stream satisfies the transmission optimization enabling condition; or it may be specified that when a sending rate of a video stream reaches a preset sending rate threshold, or a packet loss rate of a video stream is greater than a preset packet loss rate threshold, or a transmission delay of a video stream is greater than a preset transmission delay threshold, the TE1 determines that the video stream satisfies the transmission optimization enabling condition.

In this embodiment of this application, the first data stream may be a data stream of a second protocol, for example, a TCP stream. The TE1 may perform status tracking on the TCP stream according to a preset user policy, and store status information of a specified stream. The status information may include information such as a 5-tuple (a source IP address, a destination IP address, a source port, a destination port, and a protocol number) of the TCP stream, a TCP acknowledgment number in an uplink direction, a receive window size, a timestamp, and each interval of a selective acknowledgment (SACK). The uplink direction may be a direction of a data stream sent by the RE1 to the TE1, and a downlink direction may be a direction of a data stream sent by the TE1 to the RE1.

In another embodiment of this application, when determining that the first data stream satisfies the transmission optimization enabling condition, the TE1 enables processing related to transmission optimization, for example, performs a step of sending a transmission optimization enabling notification to the RE1. However, if the first data stream does not satisfy the transmission optimization enabling condition, the TE1 may not enable the processing related to the transmission optimization.

In another embodiment of this application, it may be specified that the transmission optimization is not enabled for a specific data stream type. For example, a data stream has a relatively high reliability requirement in a service scenario, for example, a data stream in a scenario of data communication between a bank ATM and a bank server, or a data stream in a scenario of data communication between a terminal using a payment APP and a bank server. In an example, a destination address in a data stream in such a service scenario with a relatively high reliability requirement may be identifier information such as an IP address of a bank server. When the destination address in the data stream or specific identifier information is the IP address of the bank server, the TE1 may determine that the data stream does not satisfy the transmission optimization enabling condition.

In this embodiment of this application, the RE2 may be a device communicating with the TE1 through the RE1. In another embodiment of this application, the RE2 and the RE1 may be a same device.

S402: The TE1 sends a transmission optimization enabling notification to the RE1.

In this embodiment of this application, when the RE2 is the device communicating with the TE1 through the RE1, the transmission optimization enabling notification is used to indicate the RE1 to skip sending an acknowledgment packet of a data packet of the first data stream to the TE1 when the RE1 receives the data packet of the first data stream. For example, after receiving Data2 encapsulated in Data1, the RE1 sends the Data2 encapsulated in the Data1 to the RE2, and when receiving an acknowledgment packet Ack3 that is in a second protocol format and that is sent by the RE2, the RE1 does not send the Ack3 to the TEL The Ack3 is used to acknowledge that the Data2 is already received by the RE2.

In this embodiment of this application, the transmission optimization enabling notification may carry an identifier of the first data stream, for example, an IP 5-tuple of a transmitting end address and/or a receiving end address of the first data stream.

S403: The RE1 sends an optimization enabling acknowledgment to the TEL

In this embodiment of this application, the RE1 may record an identifier of a data stream in the optimization enabling notification, and enable a processing step of transmission optimization processing for a packet in the data stream with the identifier. It should be noted that step S403 is not an essential step in this embodiment of this application.

S404: The TE2 sends a data packet Data2 in a second protocol format to the TE1, where the Data2 belongs to the first data stream.

In this embodiment of this application, a communication connection of the second protocol is established between the TE2 and the RE2, and a destination receiving end of the first data stream is the RE2.

S405: The TE1 sends a data frame Data1 in a first protocol format to the RE1, where the Data2 is encapsulated in the Data1.

In this embodiment of this application, the TE1 obtains the Data1 after carrying the Data2 to a frame header in the first protocol format.

S406: The RE1 sends an acknowledgment frame Ack1 in the first protocol format to the TE1, where the Ack1 is used to acknowledge that the Data1 is already received by the RE1.

In this embodiment of this application, the RE1 sends the Ack1 to the TE1 after receiving the Data1 according to a retransmission acknowledgment mechanism of a first protocol.

S407: The TE1 constructs an acknowledgment packet Ack2 in the second protocol format based on the Ack1, where the Ack2 is used to acknowledge that the Data2 is already received by the RE2.

In this embodiment of this application, for example, the TE1 may buffer packet header information of the Data2 after receiving the Data2 from the TE2. Then, the TE1 may obtain the buffered Data2 based on the Ack1, and construct the Ack2 based on the packet header information of the buffered Data2.

In this embodiment of this application, for example, the second protocol is a TCP protocol. The Ack2 includes an acknowledgment number and a receive window value, and usually further includes option information such as a timestamp. It should be noted that, before the transmission optimization is enabled, the TE1 may record the acknowledgment number and the receive window value. After the transmission optimization is enabled, the TE1 may update, based on a number of a packet in the second protocol format corresponding to the received acknowledgment frame in the first protocol format, the acknowledgment number locally recorded by the TE1, and then the TE1 constructs the Ack2 based on the locally recorded acknowledgment number. In addition, the TE1 updates the locally recorded receive window value based on a receive window value carried in a window update message sent by the RE1 to the TE1, and then the TE1 constructs the Ack2 based on the currently locally recorded receive window value. The window update message is sent by the RE1 after a receive window value carried in the acknowledgment packet in the second protocol format (for example, the Ack3) that is sent by the RE2 to the RE1 and that is received by the RE1 changes (in other words, the receive window value carried in the Ack3 is inconsistent with the receive window value locally recorded by the RE1).

For example, the TE2 sends three TCP packets: a packet of 0 to 99 bytes, a packet of 100 to 199 bytes, and a packet of 200 to 299 bytes to the RE2. Before the transmission optimization is enabled, if the acknowledgment packet in the second protocol format received by the TE1 is the packet of 0 to 99 bytes, the TE1 records that an acknowledgment number is 100 bytes, indicating that a next packet expected to be received is a packet starting from 100 bytes, and may further record the receive window value carried in the acknowledgment packet in the second protocol format, for example, 49900 bytes.

After the transmission optimization is enabled, in an example, if the TE1 receives an acknowledgment frame in the first protocol format for the packet of 200 to 299 bytes, or in other words, the TE1 fails to receive an acknowledgment frame in the first protocol format for the packet of 100 to 199 bytes, the TE1 records that the acknowledgment number is still 100 bytes, and the receive window value remains unchanged in this case. In another example, if the TE1 receives the acknowledgment frame in the first protocol format for the packet of 100 to 199 bytes after receiving the acknowledgment frame in the first protocol format for the packet of 200 to 299 bytes, the TE1 may update the acknowledgment number to 300 bytes, and the receive window value remains unchanged in this case.

In another embodiment of this application, that the TE1 constructs the Ack2 is further described as an example.

S408: The TE1 sends the Ack2 to the TE2.

In this embodiment of this application, after receiving the Ack2 sent by the TE1, the TE2 may continue to send a next to-be-sent TCP packet in the first data stream based on a configuration parameter of a sliding window protocol.

S409: The RE1 sends the Data2 to the RE2.

In this embodiment of this application, after receiving the Data1, the RE1 may decapsulate the Data1 to obtain the Data2. For example, the RE1 may remove the frame header in the first protocol format from the Data1, to obtain the Data2.

S410: The RE2 sends an acknowledgment packet Ack3 in the second protocol format to the RE1, where the Ack3 is used to acknowledge that the Data2 is already received by the RE2.

In this embodiment of this application, the RE2 sends the Ack3 after receiving the Data2 according to a retransmission acknowledgment mechanism of the second protocol.

S411: The RE1 discards the Ack3 based on the transmission optimization enabling notification.

In this embodiment of this application, the TE1 may receive a plurality of data packets in the second protocol format in the first data stream from the TE2, and the TE1 may start to determine, when receiving the first data packet of the plurality of data packets in the first data stream or after receiving a data packet following the first data packet, whether the first data stream satisfies the transmission optimization enabling condition.

In this embodiment of this application, after the TE1 determines that the first data stream satisfies the transmission optimization enabling condition, the first data stream may change, and the transmission index changes such that the transmission optimization enabling condition is not met. For example, it may be specified that when a sending rate of a video stream is less than a preset sending rate threshold, or a packet loss rate of a video stream is less than a preset packet loss rate threshold, or a transmission delay of a video stream is less than a preset transmission delay threshold, the TE1 determines that the video stream does not satisfy the transmission optimization enabling condition. Then, the TE1 may send an optimization disabling notification to the RE1 when determining that the first data stream does not satisfy the transmission optimization enabling condition.

In an example, after S411, the method may include S412 and S413.

S412: The TE1 sends a transmission optimization disabling notification to the RE1.

In this embodiment of this application, for example, the TE1 may send the transmission optimization disabling notification to the RE1 after detecting that the first data stream changes. A message of the transmission optimization disabling notification may include identifier information of the first data stream, for example, a 5-tuple of the first data stream.

S413: The RE1 sends an optimization disabling acknowledgment to the TE1

In another embodiment of this application, the RE1 may alternatively send the transmission optimization disabling notification to the TE1. For example, the RE1 may send the transmission optimization disabling notification to the TE1 after detecting that the first data stream changes.

In the foregoing notification manner of enabling and disabling the transmission optimization, the TE1 and the RE1 may flexibly control enabling and disabling of the transmission optimization.

In this application, before step S401 in which the TE1 sends the transmission optimization enabling notification to the first receiving end RE1 when determining that the first data stream satisfies the transmission optimization enabling condition, the method may further include the following step.

The TE1 may determine whether transmission reliability between the RE1 and the RE2 satisfies a reliability requirement. When the transmission reliability between the RE1 and the RE2 satisfies the reliability requirement, the TE1 determines whether the first data stream satisfies the transmission optimization enabling condition. Then, if the TE1 determines that the first data stream satisfies the transmission optimization enabling condition, the TE1 performs the step of sending the transmission optimization enabling notification to the RE1.

For example, that the transmission reliability satisfies the reliability requirement may include one or a combination of the following conditions: a packet loss rate of transmission between the RE1 and the RE2 is less than a preset packet loss rate threshold, or a length of a wired communication link between the RE1 and the RE2 is less than a preset length threshold, or a wireless communication distance between the RE1 and the RE2 is less than a preset distance threshold.

In an example, if there is a wired communication link between the RE1 and the RE2, a parameter corresponding to the transmission reliability between the RE1 and the RE2 may be configured as 1, and if there is a wireless communication link, the parameter may be configured as 0. Correspondingly, if it is detected that the parameter is 1, the step of sending the transmission optimization enabling notification to the RE1 when it is determined that the first data stream satisfies the transmission optimization enabling condition is performed; or if it is detected that the parameter is 0, the step of sending the transmission optimization enabling notification to the RE1 when it is determined that the first data stream satisfies the transmission optimization enabling condition may not be performed.

In another example, the length of the wired communication link between the RE1 and the RE2 or the wireless communication distance between the RE1 and the RE2 may be preconfigured in the RE1, and the packet loss rate of transmission between the RE1 and the RE2 may be determined based on a packet loss rate of transmission of a packet in the second protocol format within a preset time. The TE1 may send a transmission reliability parameter obtaining request to the RE1, and the RE1 may send a locally configured or statistically determined reliability parameter threshold to the TE1.

According to the foregoing method, the transmission optimization method provided in this application may be enabled only when the transmission reliability between the RE1 and the RE2 is relatively high. For example, when a wired communication link is used between the RE1 and the RE2 and a distance between the RE1 and the RE2 is relatively short, the transmission reliability is usually relatively high. Similarly, when the RE1 and the RE2 are located in a same wireless local area network, the transmission reliability is usually relatively high. Therefore, in this case, the data transmission method provided in this application is enabled, so that a probability that data needs to be retransmitted when a packet loss occurs on the RE1 and the RE2 can be greatly reduced.

In this embodiment of this application, to make full use of transmission resources on a communication link of the first protocol, when sending the Ack3 to the RE1, the RE2 may further pack, into the Ack3, a packet in the second protocol format that needs to be sent to the TE2, and sends, to the RE1, the Ack3 carrying uplink data. Therefore, when the RE1 receives the Ack3 sent by the RE2, the RE1 may first determine whether the Ack3 carries the uplink data, and the RE1 determines to discard the Ack3 if the Ack3 does not carry the uplink data, or the RE1 still sends the Ack3 to the TE1 if the Ack3 carries the uplink data. In another embodiment of this application, related processing steps to be performed when the RE1 determines that the Ack3 carries the uplink data and sends, to the TE1, the Ack3 carrying the uplink data are described in detail.

It should be noted that, on a side of the RE1, when the sliding window protocol is used to transmit a packet in the second protocol format between the TE2 and the RE2, to ensure integrity and stability of running of the second protocol, regardless of whether the RE1 discards the Ack3 or continues to transmit the Ack3, the RE1 further needs to perform the following check and processing.

Before enabling the transmission optimization, the RE1 may locally record an acknowledgment number of the second protocol and a receive window value, and after enabling the transmission optimization, update the acknowledgment number and the receive window value based on the acknowledgment frame that is in the first protocol format and that is sent to the TE1 for the packet in the second protocol format. An updating manner is the same as that in step S407. In addition, the RE1 continues to check a value of a receive window (for example, a TCP receive window) of the second protocol based on the received acknowledgment packet in the second protocol format. If the receive window value changes, or in other words, a value of a receive window field carried in the packet is inconsistent with the value locally stored in the RE1, a window update message carrying the updated receive window value and the 5-tuple of the first data stream needs to be sent to the TE1, and the receive window value locally stored in the RE1 is updated. When receiving the window update message, the TE1 sends, to the RE1, a window update acknowledgment message carrying the receive window value and the 5-tuple of the first data stream, and then the TE1 may construct the subsequent Ack2 based on the updated receive window value. In addition, the RE1 further needs to continue to check an acknowledgment number (for example, a TCP acknowledgment number) in the second protocol format based on the received acknowledgment packet in the second protocol format. If it is detected that the acknowledgment number changes, that is, a normal acknowledgment is received, the locally stored acknowledgment number is updated, and an acknowledgment number counter is reset (set to 1). If the acknowledgment number in the received acknowledgment packet in the second protocol format is not updated, that is, a packet expected to be received is not successfully received, the acknowledgment number counter is increased by 1. If the RE1 finds that a value of the acknowledgment number counter reaches 3, that is, the packet expected to be received is not successfully received, the RE1 may send, to the TE1, a fast retransmission message carrying the acknowledgment number in the second protocol format expected to be received and the 5-tuple of the first data stream. When receiving the fast retransmission message, the TE1 sends, to the RE1, a fast retransmission acknowledgment message carrying the acknowledgment number in the second protocol format and the 5-tuple of the first data stream.

It may be learned from the foregoing embodiment that the technical solution provided in this application can bring various technical effects.

First, in comparison with the interaction procedure shown in FIG. 3, in the method shown in FIG. 4 provided in this application, because the TE1 sends the acknowledgment packet in the second protocol format to the TE2, without waiting for the RE1 to send, to the TE1, the acknowledgment frame in the first protocol format in which the acknowledgment packet in the second protocol format is encapsulated, so that the TE1 can send the acknowledgment packet (TCP ACK) in the second protocol format to the TE2 earlier. From a perspective of a round-trip time (RTT) between the TE2 and the RE2, the RTT between the TE2 and the RE2 that is calculated by the TE2 actually becomes an RTT between the TE2 and the RE1. Therefore, after receiving the acknowledgment packet in the second protocol format, the TE2 may start to send a subsequent packet in the second protocol format earlier, thereby improving data transmission efficiency.

Second, in comparison with the interaction procedure shown in FIG. 3, in the method shown in FIG. 4, the RE1 does not need to send the Ack3 to the TE1, and the TE1 does not need to send an acknowledgment packet in the first protocol format for the Ack3 to the RE1. Therefore, a quantity of messages between the TE1 and the RE1 can be reduced, thereby reducing a possibility that congestion occurs on a communication link between the TE1 and the RE1. In addition, according to the technical solution of this application, when a communication link of the first protocol is a communication channel that needs to be contended for, a possibility of intensifying channel contention in data transmission can be significantly reduced. For example, the communication link of the first protocol may be a Wi-Fi channel. A transmission mechanism of the Wi-Fi channel is half-duplex, to be specific, only a device on one side can transmit a data frame at any moment. Therefore, according to the technical solution of this application, a quantity of BA frames that need to be sent through a contention channel can be reduced. To be specific, in the technical solution provided in this application, a quantity of acknowledgment packets in the second protocol format can be suppressed, to reduce an amount of data to be transmitted over the communication link of the first protocol, so that the contention channel can be significantly reduced and transmission performance can be improved.

Third, according to the technical solution of this application, a problem that a probability of a transmission error of the acknowledgment frame in the first protocol format increases when the acknowledgment packet in the second protocol format is encapsulated in the acknowledgment frame in the first protocol format for sending can be avoided. For example, in the procedure shown in FIG. 3, if the RE1 packs the Ack3 sent for a plurality of packets in the second protocol format into one BA frame for sending, once the BA frame is lost, the plurality of packets in the second protocol format corresponding to the BA frame need to be resent, thereby aggravating congestion between the TE1 and the RE1. According to the data transmission method provided in this application, this case can be avoided. In addition, a problem that a probability of a transmission error of the acknowledgment frame in the first protocol format increases due to an excessively long length when the acknowledgment packet in the second protocol format is encapsulated in the acknowledgment frame in the first protocol format for sending can also be avoided.

Fourth, if the manner of enabling the transmission optimization when the first data stream satisfies the transmission optimization enabling condition is used, the data transmission method provided in this application may be enabled for a TCP stream with a relatively low reliability requirement, to avoid impact on transmission of a TCP stream with a high reliability requirement. For example, optimization may be enabled for a video stream and a voice stream. A packet loss that occurs in these service streams has relatively small impact on a service, and optimization is not enabled for a bank service and an identity authentication service. In addition, an optimization method may be further enabled for a TCP stream whose transmission rate is less than a preset TCP rate threshold. That is, when resources between the TE1 and the RE1 are relatively abundant, the optimization method may be disabled temporarily, and the optimization method is enabled only when resource usage exceeds a specified threshold.

Fifth, the RE1 sends a connection interruption instruction to the RE2 and the TE2 when the RE1 acknowledges that the packet in the second protocol format is not successfully sent to the RE2, so that the RE2 can be enabled to initiate reestablishment of a connection of the second protocol to the TE2, and the TE3 can be instructed to resend data that has not been successfully sent to the RE2 previously.

In this application, if the Data 2 sent by the RE1 to the RE2 in step S409 in the foregoing embodiment is not successfully received by the RE2, this embodiment of this application further provides the following data transmission method.

Figure 5:
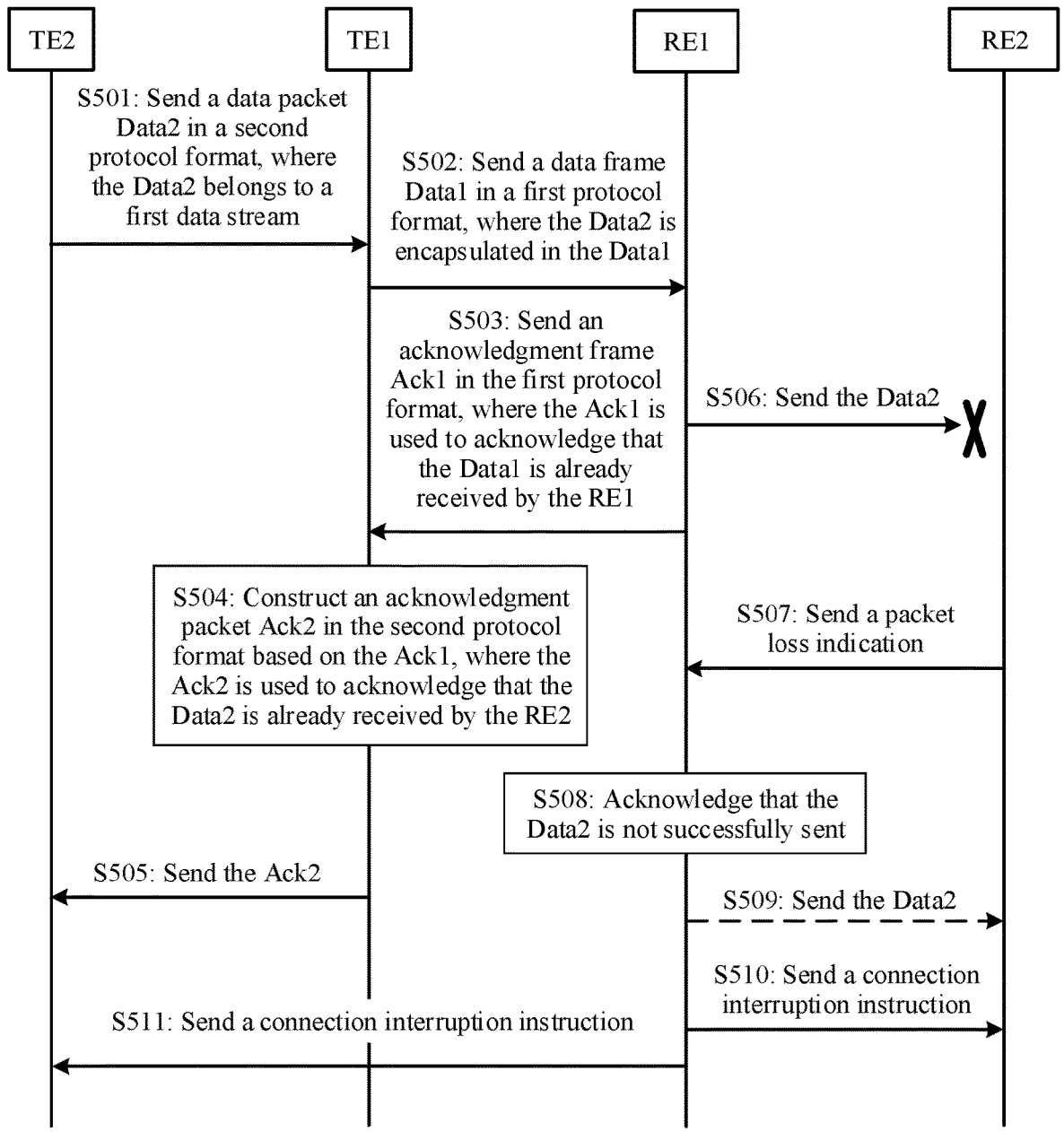
FIG. 5 is an interaction flowchart 2 of a data transmission method according to an embodiment of this application.

FIG. 5 is an interaction flowchart 2 of a data transmission method according to an embodiment of this application. As shown in FIG. 5, this embodiment of this application may include the following steps.

S501: A TE2 sends a data packet Data2 in a second protocol format to a TE1, where the Data2 belongs to a first data stream.

S502: The TE1 sends a data frame Data1 in a first protocol format to an RE1, where the Data2 is encapsulated in the Data1.

S503: The RE1 sends an acknowledgment frame Ack1 in the first protocol format to the TE1, where the Ack1 is used to acknowledge that the Data1 is already received by the RE1.

S504: The TE1 constructs an acknowledgment packet Ack2 in the second protocol format based on the Ack1, where the Ack2 is used to acknowledge that the Data2 is already received by an RE2.

S505: The TE1 sends the Ack2 to the TE2.

In this embodiment of this application, S501 to S506 are similar to S405 to S409 in the foregoing embodiment.

S506: The RE1 sends the Data2 to the RE2.

The RE2 fails to receive the Data2.

S507: The RE2 sends a packet loss indication to the RE1.

For example, the packet loss indication may be a three-time duplicate acknowledgment (DACK) message. It should be noted that S507 is not an essential step in this embodiment of this application. The indication may indicate that the Data2 is not received by the RE2.

S508: The RE1 acknowledges that the Data2 is not successfully sent.

The RE1 may acknowledge, based on the packet loss indication received from the RE2, that the Data2 is not successfully sent, or the RE1 may wait for preset duration after sending the Data2, and if an Ack3 used to acknowledge that the Data2 is already successfully received by the RE2 is not received within the preset duration, or in other words, if the waiting expires, acknowledge that the Data2 is not successfully sent.

S509: The RE1 sends the Data2 to the RE2.

The RE1 may buffer the Data2 after receiving the Data2 in S502. Then, the RE1 resends the buffered Data2 to the RE2 when acknowledging that the Data2 is not successfully sent. After S509, if the RE1 receives the Ack3 within the preset duration, the RE1 acknowledges that the Data2 is successfully sent. In this case, the RE1 may not need to perform the following steps S510 and S511, and the RE1 may further delete the buffered Data2. It should be noted that step S509 is not an essential step in this embodiment of this application.

S510: The RE1 sends a connection interruption instruction to the RE2.

In an example, the RE1 may send a TCP reset request (TCP RST) to the RE2. After receiving the TCP RST, the RE2 actively requests the TE2 to re-establish a TCP connection, and requests the TE2 to perform retransmission starting from the Data2.

S511: The RE1 sends a connection interruption instruction to the TE2.

In an example, the RE1 may send a TCP reset request (TCP RST) to the TE2. After receiving the TCP RST, the TE2 actively requests the RE2 to re-establish a TCP connection, and requests the RE2 to indicate a number of a packet in the second protocol format that needs to be resent.

In this embodiment of this application, at least one of S510 and S511 may be performed.

According to the foregoing method, it can be ensured that when a packet loss occurs in data transmission between the RE1 and the TE1, the RE1 or the TE2 can retransmit a lost packet in the second protocol format to the RE2, thereby ensuring transmission reliability of the packet in the second protocol format.

In this embodiment of this application, it should be noted that, to ensure reliability of message transmission, various messages in the foregoing embodiment may be sent by using a TCP socket. In an example, a TCP socket connection may be established between the TE1 and the RE1. Then, a message may be sent between the TE1 and the RE1 by using a sending function of the socket, to ensure reliability of message sending. For example, the foregoing messages may be a transmission optimization enabling notification, a transmission optimization disabling notification, a window update message, a window update acknowledgment message, a fast retransmission message, a fast retransmission acknowledgment message, a packet loss indication, and the like. This is not limited in this application.

It should be further noted that, the transmission manner of the foregoing message may be alternatively a sending manner of an associated message, that is, content of the message is filled in uplink and downlink data packets for transmission. To help a receiver identify and extract the associated message, a special flag needs to be carried in a header of the data packet. When sending an associated message, a transmitter carries a special flag in the associated message, and the associated message to which the special flag is carried is referred to as a request message. After receiving these packets with special flags, the receiver also carries special flags in replied associated packets, indicating an acknowledgment of a message. The replied associated packet to which the special flag is carried is referred to as an acknowledgment message. Considering that these packets with special flags may be lost in a channel (for example, a Wi-Fi channel) of a communication link of a first protocol, when the transmitter fails to receive an acknowledgment message within a specific time, the transmitter may keep sending the message in the associated packet. For the receiver, if the transmitter no longer sends an associated packet with a special flag within a period of time, it indicates that the acknowledgment message is already received by the transmitter. In an example, a message of the transmission optimization disabling notification may be carried in a data packet of the first data stream for sending.

The following describes in detail the data transmission method provided in this application with reference to an actual application scenario.

In an application scenario of this application, communication may be performed between the TE2 and the TE1, between the TE1 and the RE1, and between the RE1 and the RE2 through a communication connection of a wired network, or through a communication connection of a wireless network. In an example, the TE1 and the TE2 may communicate with each other through a wired cable, and the RE1 and the RE2 communicate with each other based on a communication connection of a wired network cable. For example, the wired cable may be an Ethernet network cable, an optical fiber, or a cable television line. In another example, the RE1 and the RE2 may communicate with each other based on a communication connection of a wireless local area network. The TE1 and the RE1 may communicate with each other through a communication connection of a wireless network.

In an application scenario of this application, the first protocol may be a medium access control (MAC) layer protocol, for example, a WLAN protocol. For example, the TE1 and the RE1 may communicate with each other by using a wireless fidelity (Wi-Fi) network. In this embodiment of this application, the second protocol may be an upper-layer protocol of the first protocol, and the second protocol may be a connection-oriented transmission protocol, for example, a transmission control protocol (TCP). In another embodiment of this application, the second protocol may be another connection-oriented application layer protocol or the like.

In an application scenario of this application, the network device in the network architecture shown in FIG. 1 may be a device that provides a service for user equipment in a network, for example, a server. For example, the server may be configured to provide a service such as video browsing and downloading. The gateway device may be an intermediate network device. For example, the TE1 may be a wireless access point of the RE1, and may be specifically a home gateway (HGW). The user equipment may be a device such as a set-top box (STB), a laptop, a mobile phone, or a computer (PC).

It should be noted that, when the gateway device communicates with the network device through a communication connection of a wired network, the gateway device may have a wired network interface, and when the gateway device communicates with the user equipment through a communication connection of a wireless network, the gateway device may have a wireless network interface. For example, the gateway device may establish a wireless network connection such as Wi-Fi with the user equipment through the wireless network interface, so that the user equipment can be connected to the network. In addition, the gateway device may establish a wired connection with the network device through the wired network interface, so that the network device can provide a service for the user equipment by using the gateway device.

For example, the gateway device may be a home gateway. For example, the home gateway may communicate with the server by using a wide area network (WAN). The wide area network may be a wired network, and may include a router, a switch, and the like. The user equipment may be connected to the gateway device by using a built-in communications module that supports wireless access, for example, a Wi-Fi communications module, and by using a wireless network such as Wi-Fi, and may establish a connection such as a TCP connection with the network device by using the gateway device, so that data can be transmitted between the user equipment and the network device. The user equipment in the network shown in FIG. 1 is integrated with a function of a station (STA). The function of the STA allows the user equipment to communicate with the gateway device by using a wireless network. For example, a STA function module may be built in the STB. In an example, the STA function module may be used as a processing module of the first protocol, for example, a MAC module, and the STB may further include a processing module of the second protocol, for example, a TCP module.

In an application scenario of this application, the network device in FIG. 2 may be the same as the network device in FIG. 1, and the gateway device in FIG. 2 may be the same as the gateway device in FIG. 1. In FIG. 2, the user equipment and the gateway device are not directly connected, but are connected by using the transmission device. A wireless network connection may be established between the transmission device and the gateway device, and a wired connection may be established between the transmission device and the user equipment. Therefore, the user equipment establishes a data connection such as a TCP connection with the network device by using the transmission device and the gateway device, to perform data transmission with the network device.

For example, the transmission device may have both an access point (AP) function and a STA function. The AP function of the transmission device may allow access of user equipment having the STA function, and the STA function of the transmission device may enable the transmission device to access the HGW. For example, the transmission device may be an AP device. A STA function module may be built in the transmission device, and the transmission device is connected to the gateway device by using the STA function module through a Wi-Fi network. The user equipment connected to the gateway device in FIG. 1 and the transmission device connected to the gateway device in FIG. 2 may be collectively referred to as a terminal device.

In an application scenario of this application, the gateway device and the user equipment in the network architecture shown in FIG. 1, and the gateway device and the transmission device in the network architecture shown in FIG. 2 may be alternatively connected by using one or more routers and switches, and the transmission device and the user equipment in the network architecture shown in FIG. 2 may be alternatively connected by using one or more routers and switches. The STA function module may be alternatively disposed independent of the transmission device or the user equipment, or in other words, may exist as a separate device.

Based on the network architectures shown in the foregoing embodiments and any one or a combination of the foregoing application scenarios, the data transmission method provided in this embodiment of this application may be used in a scenario in which data is transmitted in a wireless network according to a TCP protocol. In an example, the TE2 may send a TCP data packet of a data stream according to a sliding window protocol. The TE2 may determine, based on a receive window value carried in a TCP acknowledgment packet received from the TE1, whether a packet loss occurs.

It should be noted that, when data is transmitted according to the TCP protocol, a transmitting end may control a size of a to-be-transmitted data stream based on a size of a TCP receive window of a receiving end according to the TCP protocol, and a receive window value indicates the size of the TCP receive window. The size of the TCP receive window usually changes in real time with factors such as a packet loss situation and a buffer of the receiving end in a data transmission process. Therefore, the receiving end carries a real-time receive window value of the receiving end in a TCP ACK packet returned to the transmitting end, so that the transmitting end can adjust a to-be-sent data stream based on the receive window value of the receiving end. Therefore, in the network architectures shown in FIG. 1 and FIG. 2, the network device serves as the transmitting end to send a TCP packet to the user equipment serving as the receiving end, and when sending a TCP ACK packet to the network device, the user equipment carries a current receive window value of the user equipment in the TCP ACK packet.

Figure 6:
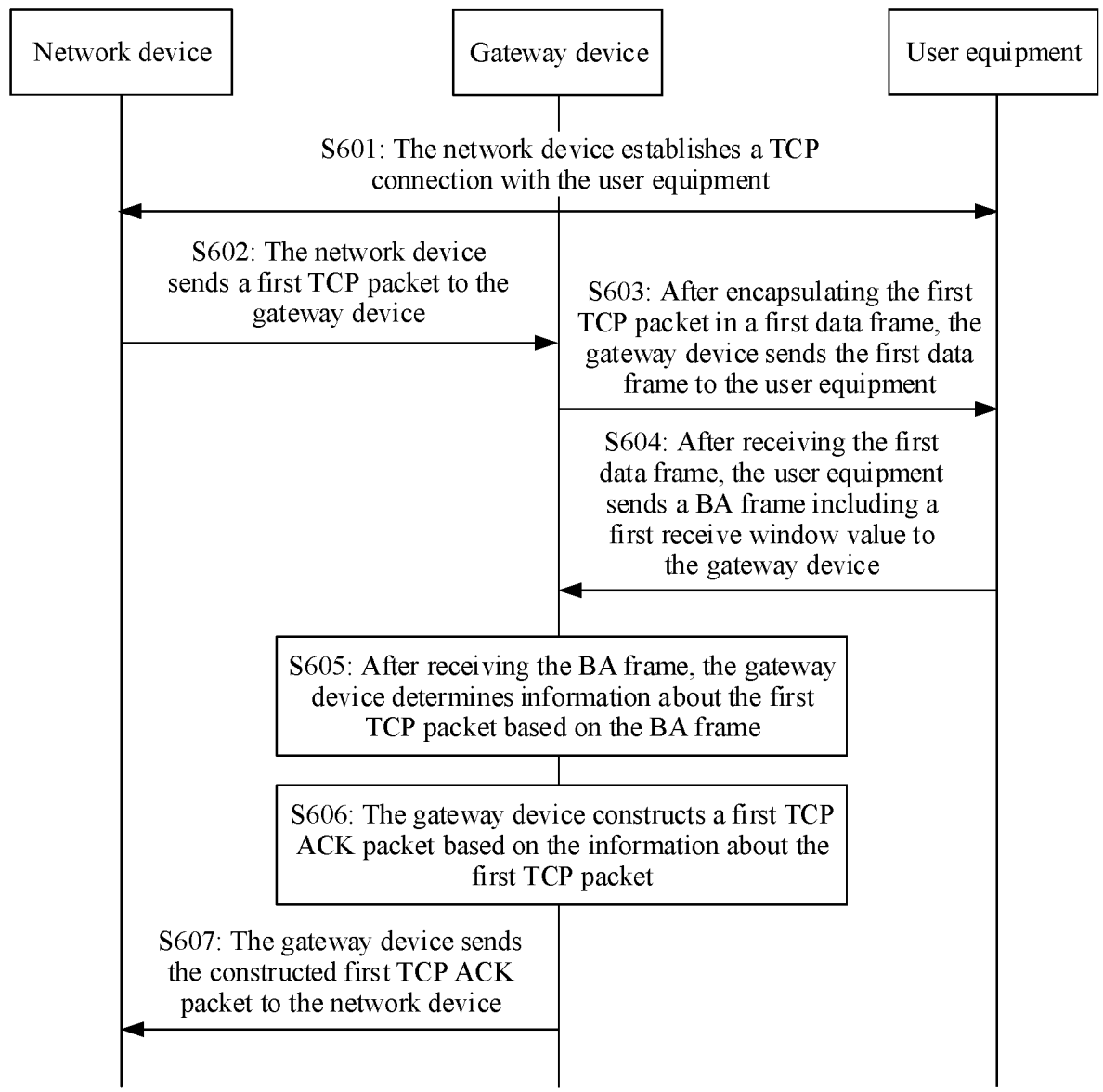
FIG. 6 is a schematic flowchart of a data transmission method according to an embodiment of this application.

An embodiment of this application provides a data transmission method, applied to the network architecture shown in FIG. 1. FIG. 6 is a schematic flowchart of a data transmission method according to an embodiment of this application. As shown in FIG. 6, the method includes the following steps.

S601: A network device establishes a TCP connection with user equipment.

The TCP connection is established between the network device and the user equipment by using a gateway device, so that the network device and the user equipment can communicate with each other through the established TCP connection.

The network device sends a TCP packet to the user equipment in a process of data transmission between the network device and the user equipment. After receiving the TCP packet sent by the network device, the user equipment replies with a TCP ACK packet corresponding to the TCP packet. The TCP ACK packet is used to acknowledge that the TCP packet corresponding to the TCP ACK packet is already received by the user equipment. The user equipment sends the TCP ACK packet corresponding to the TCP packet, to notify the network device that the TCP packet is already received by the user equipment. The network device acknowledges, by receiving the TCP ACK packet corresponding to the TCP packet, that the TCP packet is already received by the user equipment. The network device retransmits the TCP packet if the network device acknowledges that the user equipment fails to receive the TCP packet.

S602: The network device sends a first TCP packet to a gateway device.

The first TCP packet is sent by the network device to the user equipment. After the TCP connection is established between the network device and the user equipment by using the gateway device, data may be transmitted between the network device and the user equipment by using the gateway device. The network device sends, to the gateway device through a wired connection between the network device and the gateway device, the first TCP packet to be sent to the user equipment, and transmits the first TCP packet to the user equipment by using the gateway device.

S603: After encapsulating the first TCP packet in a first data frame, the gateway device sends the first data frame to the user equipment.

After receiving the first TCP packet sent by the network device, the gateway device needs to encapsulate the first TCP packet in the first data frame and then transmit the first data frame. The first TCP packet is encapsulated in the first data frame, and the gateway device sends the first data frame to the user equipment after completing the encapsulation.

It should be noted that, in this embodiment of this application, encapsulating a TCP packet in a data frame means carrying a wireless local area network (WLAN) header to the TCP packet, to generate the data frame including the TCP packet.

It should be noted that, after encapsulating the first TCP packet, the gateway device may store a correspondence between information about the first data frame and information about the first TCP packet, so that the gateway device subsequently searches for the information about the first TCP packet based on the information about the first data frame, and constructs, based on the information about the first TCP packet, a TCP ACK packet corresponding to the first TCP packet. When the TCP connection is established between the network device and the user equipment, the gateway device may further obtain, by using data transmitted in a connection establishment process, information related to the TCP connection, for example, 5-tuple information of the TCP connection, to construct the TCP ACK packet. The information about the first TCP packet may include a sequence number of the first TCP packet, a packet length of the first TCP packet, and the like, and the information about the first data frame includes a sequence number of the first data frame.

S604: After receiving the first data frame, the user equipment sends a BA frame including a first receive window value to the gateway device.

The BA frame is used to indicate that the first data frame is already received by the user equipment. A data frame is transmitted between the user equipment and the gateway device by using a wireless network. After the gateway device sends the data frame to the user equipment by using the wireless network, the user equipment returns the BA frame to the gateway device by using the wireless network. After receiving the BA frame, the gateway device may acknowledge that the data frame is already received by the user equipment.

After receiving the first data frame, the user equipment may obtain the first TCP packet by parsing the first data frame, or in other words, the user equipment receives the first TCP packet. Generally, in this case, the user equipment needs to send, to the network device by using the gateway device, a first TCP ACK packet corresponding to the first TCP packet, and carries the current first receive window value of the user equipment in the first TCP ACK packet. In this embodiment of this application, to reduce data to be transmitted between the gateway device and the user equipment, after the user equipment sends the BA frame to the gateway device, the gateway device may construct the first TCP ACK packet used to acknowledge that the first TCP packet is already received by the user equipment, and send the first TCP ACK packet to the network device. Therefore, the user equipment does not need to send the first TCP ACK packet to the gateway device. However, the network device needs to determine a receive window value of the user equipment by using the first TCP ACK packet. Therefore, when sending the BA frame to the gateway device, the user equipment may carry the first receive window value of the user equipment in the BA frame, and send the first receive window value of the user equipment to the gateway device. After receiving the BA frame, the gateway device may carry the first receive window value, in the BA frame, in the first TCP ACK packet when constructing the first TCP ACK packet, so that the network device can determine the first receive window value of the user equipment based on the first TCP ACK packet.

A field length of a receive window value is only two bytes, and carrying of the receive window value to the BA frame does not greatly affect transmission of the BA frame. Therefore, in this embodiment of this application, an amount of data to be transmitted by using Wi-Fi can be reduced basically without affecting transmission of the BA frame, thereby improving performance of TCP data transmission.

In an optional implementation of this embodiment of this application, before receiving the first data frame, the user equipment may further obtain the first receive window value when receiving, through a wireless connection, a second data frame sent by the gateway device.

A second TCP packet is encapsulated in the second data frame. If the user equipment obtains the first receive window value of the user equipment when receiving the second data frame, the first receive window value may be sent to the gateway device by using the BA frame in this step.

It should be noted that each time the user equipment obtains a receive window value, the user equipment does not necessarily immediately send the BA frame to the gateway device. Therefore, the user equipment may first store the obtained receive window value, and then send the receive window value to the gateway device by using the BA frame when sending the BA frame to the gateway device.

In addition, to further ensure transmission stability of a BA frame, in this embodiment of this application, a BA frame including the receive window value may be sent to the gateway device when the receive window value obtained by the user equipment changes, and a BA frame that does not include the receive window value is sent to the gateway device when the receive window value obtained by the user equipment does not change, so that impact on transmission of the BA frame can be reduced.

Specifically, when obtaining the first receive window value, the user equipment may determine whether the obtained first receive window value is the same as a stored receive window value. If the first receive window value is different from the stored receive window value, it indicates that the receive window value of the user equipment changes, and a BA frame including the receive window value may be sent to the gateway device. If the first receive window value is the same as the stored second receive window value, it indicates that the receive window value of the user equipment does not change, and a BA frame that does not include the receive window value may be sent to the gateway device.

S605: After receiving the BA frame, the gateway device determines information about the first TCP packet based on the BA frame.

After receiving the BA frame, the gateway device may acknowledge that the first data frame is already received by the user equipment, and the first TCP packet is encapsulated in the first data frame. Therefore, it may be acknowledged that the user equipment also receives the first TCP packet.

The gateway device may determine the information about the first TCP packet based on the BA frame, to construct the first TCP ACK packet used to acknowledge that the first TCP packet is already received by the user equipment.

Specifically, in step S603, the gateway device may store the sequence number of the first data frame sent to the user equipment, the information about the first TCP packet, and a correspondence between the sequence number of the first data frame and the information about the first TCP packet. In this step, the gateway device may obtain, based on information in the BA frame, a sequence number of a data frame acknowledged by the BA frame, to be specific, the sequence number of the first data frame, and then may determine, based on the sequence number of the first data frame and the correspondence, the information about the first TCP packet encapsulated in the first data frame.

S606: The gateway device constructs a first TCP ACK packet based on the information about the first TCP packet.

The first TCP ACK packet is used to acknowledge that the first TCP packet is already received by the user equipment. The gateway device may construct the first TCP ACK packet based on the information about the first TCP packet, and the user equipment does not need to send the first TCP ACK packet, thereby reducing an amount of data to be transmitted in the wireless network.

The user equipment usually notifies the network device of the receive window value of the user equipment by carrying the receive window value of the user equipment to a TCP ACK packet. Therefore, when constructing the first TCP ACK packet, the gateway device may further carry the receive window value of the user equipment in the first TCP ACK packet, to be specific, the first receive window value in the BA frame.

In an optional implementation of this embodiment of this application, the user equipment may send a changed receive window value by using the BA frame only when the receive window value changes. Therefore, the gateway device may store the receive window value when receiving, for the first time, a BA frame including the receive window value. When a TCP ACK packet is constructed after another BA frame is subsequently received, it is determined whether the BA frame includes the receive window value. If the BA frame includes the receive window value, it indicates that the receive window value of the user equipment changes. In this case, the TCP ACK packet needs to be constructed based on the receive window value included in the BA frame. If the BA frame does not include the receive window value, it indicates that the receive window value of the user equipment does not change. In this case, the TCP ACK packet needs to be constructed based on a receive window value stored in the gateway device. In addition, when the BA frame includes the receive window value, the receive window value stored in the gateway device is updated to the receive window value included in the BA frame, to ensure accuracy of the receive window value stored in the gateway device.

Specifically, in this step, after receiving the BA frame, the gateway device may determine whether the BA frame includes the first receive window value. If the BA frame includes the first receive window value, the first receive window value is carried in the first TCP ACK packet, and the receive window value stored in the gateway device is updated to the first receive window value included in the BA frame; or if the BA frame does not include the first receive window value, the receive window value stored in the gateway device is carried in the first TCP ACK packet.

It should be noted that all receive window values stored in the gateway device are obtained by the gateway device from the received BA frame sent by the user equipment.

S607: The gateway device sends the constructed first TCP ACK packet to the network device.

After constructing the first TCP ACK packet, the gateway device sends the constructed first TCP ACK packet to the network device, so that the network device can acknowledge that the first TCP packet is already received by the user equipment. In addition, when the first TCP ACK packet includes the receive window value of the user equipment, the receive window value of the user equipment is determined based on the first TCP ACK packet.

In this embodiment of this application, after receiving, through a wireless connection, a data frame that is sent by the gateway device and in which a TCP packet is encapsulated, the user equipment sends a BA frame including a receive window value to the gateway device. After receiving a BA frame used to acknowledge that the data frame is already received by the terminal device, the gateway device may determine, based on the BA frame, information about the TCP packet encapsulated in the data frame, so that a TCP ACK packet used to acknowledge that the TCP packet is already received by the user equipment can be constructed, and the constructed TCP ACK packet used to acknowledge that the TCP packet is already received by the user equipment is sent to the network device. In this way, after receiving the BA frame, the gateway device may construct the TCP ACK packet used to acknowledge that the TCP packet is already received by the user equipment, and send the TCP ACK packet to the network device. Therefore, the user equipment does not need to send the TCP ACK packet to the gateway device after sending the BA frame, and the gateway device may also construct the TCP ACK packet and send the TCP ACK packet to the network device, to complete a retransmission acknowledgment mechanism. In this way, an amount of data to be transmitted through a wireless connection between the gateway device and the user equipment is reduced, thereby improving performance of TCP data transmission.

According to a principle of a TCP/internet protocol (IP) protocol stack, a device may be divided into different network structures, for example, divided into five layers of network structures, including an application layer, a TCP layer, an IP layer, a MAC layer, and a physical layer. The application layer, the TCP layer, the IP layer, and the MAC layer are equivalent to an application module, a TCP module, an IP module, and a MAC module into which a controller of the device is divided, and are separately used to perform corresponding functions. In this embodiment of this application, the user equipment may also be divided into a network structure, and the network structure may specifically include a TCP module and a MAC module. The MAC module communicates with the gateway device to transmit a data frame, and the TCP module obtains, from the MAC module, a TCP packet to be sent to the user equipment, and processes the TCP packet.

Therefore, in another optional implementation of this embodiment of this application, the user equipment may include a processing module of a second protocol and a processing module of a first protocol. In an example, the processing module of the second protocol is a TCP module, and the processing module of the first protocol is a MAC module. In step S604, the user equipment receives the first data frame by using the MAC module, and sends the BA frame including the first receive window value to the gateway device by using the MAC module.

After receiving a data frame sent by the gateway device, the MAC module parses the data frame to obtain a TCP packet encapsulated in the data frame, and then sends the TCP packet to the TCP module for processing. After receiving the TCP packet, the TCP module returns, to the MAC module, a TCP ACK packet indicating that the TCP packet is already received, and carries a receive window value of the user equipment in the TCP ACK packet. Therefore, the MAC module may obtain the receive window value of the user equipment by using the TCP ACK packet sent by the TCP module. Therefore, the first receive window value included in the BA frame sent by the MAC module to the gateway device in step S604 may be obtained by the MAC module by sending the second TCP packet to the TCP module before the MAC module receives the first data frame and receiving a second TCP ACK packet that is corresponding to the second TCP packet and that is sent by the TCP module.

After obtaining the receive window value from the TCP ACK packet sent by using the TCP module, the MAC module may not necessarily immediately send the BA frame to the gateway device. Therefore, the MAC module may first store the obtained receive window value, and when subsequently sending the BA frame to the gateway device, send the receive window value to the gateway device by using the BA frame.

In a process in which the MAC module stores the receive window value of the user equipment, the receive window value of the user equipment may change. To ensure accuracy of the stored receive window value, the MAC module needs to update the stored receive window value.

Specifically, when obtaining the first receive window value by using the second TCP ACK packet, the MAC module may determine whether the obtained first receive window value is the same as a stored second receive window value. If the first receive window value is different from the second receive window value, it indicates that the receive window value of the user equipment changes, and the second receive window value may be updated to the first receive window value. If the first receive window value is the same as the stored second receive window value, it indicates that the receive window value of the user equipment does not change, and the second receive window value is not updated.

To further ensure transmission stability of a BA frame, the MAC module may send a BA frame including the receive window value to the gateway device when the obtained receive window value changes, and send a BA frame that does not include the receive window value to the gateway device when the obtained receive window value does not change, so that impact on transmission of the BA frame can be reduced.

Specifically, when sending a BA frame, the MAC module may determine whether the MAC module updates, in a target time period, the receive window value stored in the MAC module. The target time period indicates a time period between a moment at which the MAC module previously sends a BA frame to the gateway device and a current moment. When the MAC module updates, in the target time period, the receive window value stored in the MAC module, it indicates that the obtained receive window value changes, and the MAC module sends, through the wireless connection, a BA frame including the first receive window value to the gateway device. When the MAC module does not update, in the target time period, the receive window value stored in the MAC module, it indicates that the obtained receive window value does not change, and the MAC module sends, through the wireless connection, a BA frame that does not include the first receive window value to the gateway device.

In addition, in the foregoing process, when the first receive window value is different from the second receive window value, the MAC module may further update the stored second receive window value to the first receive window value, to ensure accuracy of the second receive window value stored in the MAC module.

In another optional implementation of this embodiment of this application, after receiving the first data frame, the MAC module may further send the first TCP packet to the TCP module. In addition, the MAC module may further buffer the first TCP packet. In this way, when the TCP module fails to receive the first TCP packet, the first TCP packet may be retransmitted, to ensure that the TCP module can receive the first TCP packet.

Specifically, the MAC module may set a retransmission mechanism.

For example, after sending the first TCP packet to the TCP module, the MAC module may retransmit the first TCP packet to the TCP module when receiving a preset quantity of DACK packets sent by the TCP module.

The TCP module may periodically send a DACK packet when the TCP module fails to receive the first TCP packet. When receiving the preset quantity of DACK packets, the MAC module may determine that the TCP module fails to receive a TCP packet. In this case, the TCP packet may be retransmitted to the TCP module. The preset quantity may be set to 3.

For another example, after the MAC module sends the first TCP packet to the TCP module, the MAC module may retransmit the first TCP packet to the TCP module when a target TCP ACK packet sent by the TCP module is not received within the preset time period.

The target TCP ACK packet indicates that the first TCP packet is already received by the TCP module. The TCP module feeds back the target TCP ACK packet in time when receiving the first TCP packet. Therefore, if the MAC module fails to receive a TCP ACK packet within the preset time period, it may indicate that the TCP module fails to receive a TCP packet. In this case, the MAC module may retransmit the first TCP packet to the TCP module. A length of the preset time period may be set based on an actual scenario.

It should be noted that, after the MAC module sends the first TCP packet to the TCP module, when receiving the target TCP ACK packet sent by the TCP module, the MAC module may acknowledge that the first TCP packet is already received by the TCP module. In this case, the buffered first TCP packet may be deleted.

In this embodiment of this application, to avoid an error during buffering of the first TCP packet, the MAC module may further store information about the TCP connection for transmitting the first TCP packet, for example, IP addresses and port numbers of the network device and the user equipment. In addition, when the first TCP packet is being buffered, the sequence number of the first TCP packet, a sequence number of a packet in which the first TCP packet is encapsulated, and the like are stored. The foregoing information is stored to uniquely identify a TCP packet, to avoid an error during buffering or retransmission of the first TCP packet.

Figure 7:
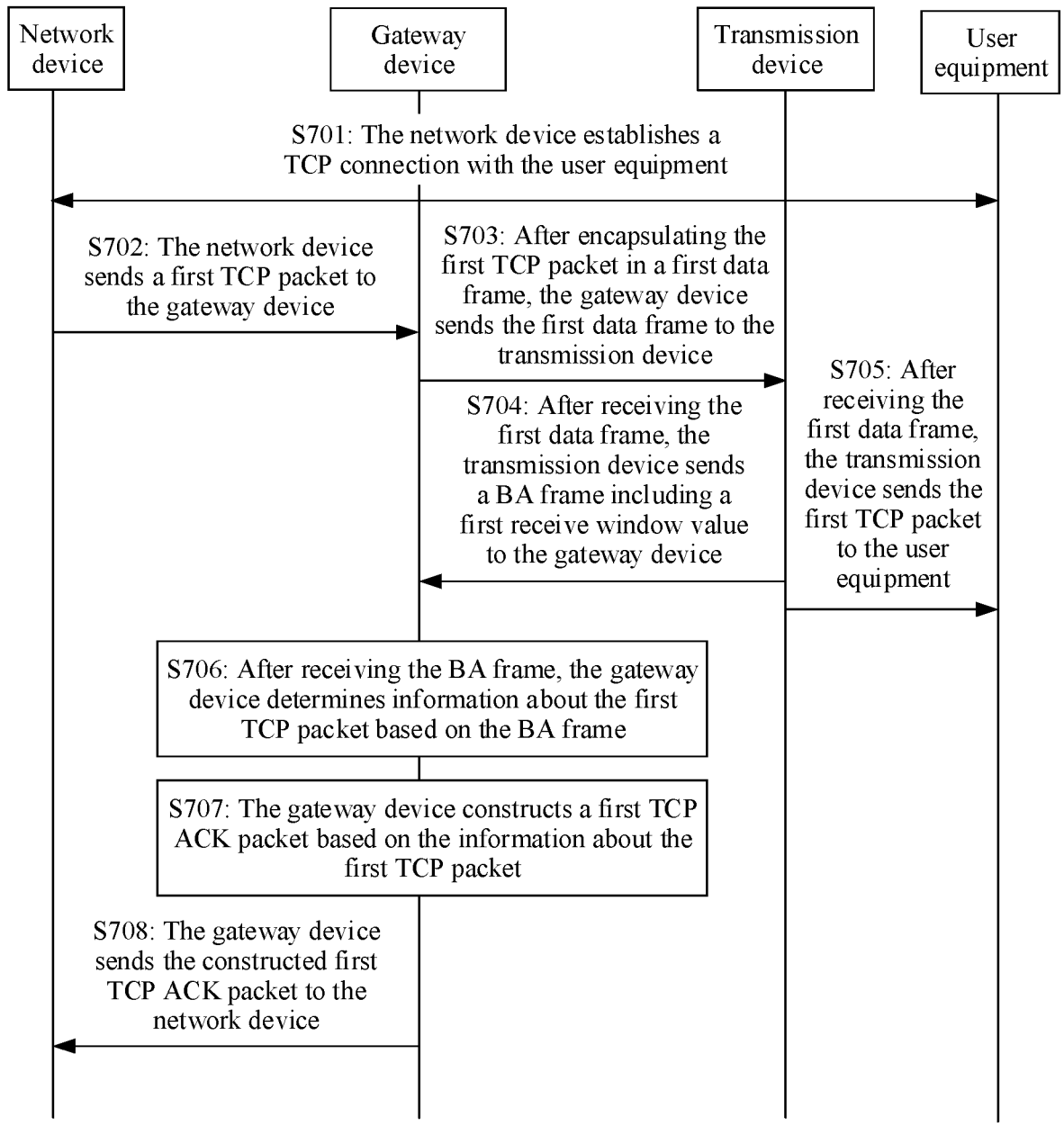
FIG. 7 is a schematic flowchart of a data transmission method according to another embodiment of this application.

Another embodiment of this application provides a data transmission method, applied to the network architecture shown in FIG. 2. FIG. 7 is a schematic flowchart of a data transmission method according to another embodiment of this application. As shown in FIG. 7, the method includes the following steps.

S701: A network device establishes a TCP connection with user equipment.

A data processing process and a principle in this step are the same as the data processing process and the principle in step S601, and details are not described herein again.

S702: The network device sends a first TCP packet to a gateway device.

A data processing process and a principle in this step are the same as the data processing process and the principle in step S602, and details are not described herein again.

S703: After encapsulating the first TCP packet in a first data frame, the gateway device sends the first data frame to a transmission device.

A data processing process and a principle in this step are the same as the data processing process and the principle in step S603, and a difference lies in that the gateway device sends the first data frame to the transmission device in step S703, but the gateway device sends the first data frame to the user equipment in step S603.

S704: After receiving the first data frame, the transmission device sends a BA frame including a first receive window value to the gateway device.

The BA frame is used to indicate that the first data frame is already received by the transmission device. A data frame is transmitted between the transmission device and the gateway device by using a wireless network. After the gateway device sends the data frame to the transmission device by using the wireless network, the transmission device returns the BA frame to the gateway device by using the wireless network. After receiving the BA frame, the gateway device may acknowledge that the data frame is already received by the transmission device.

After receiving the first data frame, the transmission device may obtain the first TCP packet by parsing the first data frame, and sends the first TCP packet to the user equipment. Generally, in this case, after receiving a first TCP ACK packet that is returned by the user equipment and that is corresponding to the first TCP packet, the transmission device needs to send the first TCP ACK packet to the network device by using the gateway device, and the user equipment carries the first receive window value of the user equipment in the first TCP ACK packet.

Because there is a wired connection between the user equipment and the transmission device, data transmission is relatively reliable, and a possibility of a packet loss is relatively low. Therefore, if the transmission device successfully receives the first data frame, it may usually indicate that the user equipment successfully receives the first TCP packet. Therefore, in this embodiment of this application, to reduce data to be transmitted between the gateway device and the transmission device, after the transmission device sends the BA frame to the gateway device, the gateway device may construct the first TCP ACK packet used to acknowledge that the first TCP packet is already received by the user equipment, and send the first TCP ACK packet to the network device. Therefore, the transmission device does not need to send the first TCP ACK packet to the gateway device.

However, the network device needs to determine a receive window value of the user equipment by using the first TCP ACK packet. Therefore, the transmission device may determine the first receive window value of the user equipment by using a TCP ACK packet sent by the user equipment, and when sending the BA frame to the gateway device, carry the first receive window value of the user equipment in the BA frame, and send the first receive window value of the user equipment to the gateway device. After receiving the BA frame, the gateway device may carry the first receive window value, in the BA frame, in the first TCP ACK packet when constructing the first TCP ACK packet, so that the network device can determine the first receive window value of the user equipment based on the first TCP ACK packet.

A field length of a receive window value is only two bytes, and carrying of the receive window value to the BA frame does not greatly affect transmission of the BA frame. Therefore, in this embodiment of this application, an amount of data to be transmitted by using Wi-Fi can be reduced basically without affecting transmission of the BA frame, thereby improving performance of TCP data transmission.

In an optional implementation of this embodiment of this application, before the user equipment receives the first data frame, when receiving, through a wireless connection, a second data frame that is sent by the gateway device and in which a second TCP packet is encapsulated, the user equipment may further send the second TCP packet to the user equipment through the wired connection, and receive a second TCP ACK packet sent by the user equipment through the wired connection. The second TCP ACK packet includes the first receive window value, and the second TCP ACK packet is used to indicate that the second TCP packet is already received by the user equipment.

After receiving the second data frame, the transmission device sends the second TCP packet encapsulated in the second data frame to the user equipment. After receiving the second TCP packet, the user equipment replies with the second TCP ACK packet, and carries the first receive window value of the user equipment in the second TCP ACK packet, and the transmission device may obtain the first receive window value of the user equipment by using the second TCP ACK packet. Therefore, in this step, the first receive window value may be sent to the gateway device by using the BA frame.

It should be noted that each time the transmission device obtains a receive window value, the transmission device does not necessarily immediately send the BA frame to the gateway device. Therefore, the transmission device may first store the obtained receive window value, and then send the receive window value to the gateway device by using the BA frame when sending the BA frame to the gateway device.

In a process in which the transmission device stores the receive window value of the user equipment, the receive window value of the user equipment may change. To ensure accuracy of the stored receive window value, the transmission device needs to update the stored receive window value.

Specifically, when obtaining the first receive window value, the transmission device may determine whether the obtained first receive window value is the same as a stored second receive window value. If the first receive window value is different from the second receive window value, it indicates that the receive window value of the user equipment changes, and the second receive window value may be updated to the first receive window value. If the first receive window value is the same as the stored second receive window value, it indicates that the receive window value of the user equipment does not change, and the second receive window value is not updated.

In addition, to further ensure transmission stability of a BA frame, in this embodiment of this application, a BA frame including the receive window value may be sent to the gateway device when the receive window value obtained by the transmission device changes, and a BA frame that does not include the receive window value is sent to the gateway device when the receive window value obtained by the transmission device does not change, so that impact on transmission of the BA frame can be reduced.

Specifically, when sending a BA frame, the transmission device may determine whether the transmission device updates, in a target time period, the receive window value stored in the transmission device. The target time period indicates a time period between a moment at which the transmission device previously sends a BA frame to the gateway device and a current moment. When the receive window value stored in the transmission device is updated in the target time period, it indicates that the receive window value obtained by the transmission device changes, and the transmission device sends, through the wireless connection, a BA frame including the first receive window value to the gateway device. When the receive window value stored in the transmission device is not updated in the target time period, it indicates that the receive window value obtained by the transmission device does not change, and the transmission device sends, through the wireless connection, a BA frame that does not include the first receive window value to the gateway device.

S705: After receiving the first data frame, the transmission device sends the first TCP packet to the user equipment.

After obtaining the first TCP packet from the first data frame through parsing, the transmission device sends the first TCP packet to the user equipment through the wired connection.

After receiving the first TCP packet, the user equipment returns, to the transmission device, the first TCP ACK packet indicating that the first TCP packet is already received, and carries the first receive window value of the user equipment in the first TCP ACK packet. Therefore, the transmission device may obtain a receive window value of the user equipment by using a TCP ACK packet sent by the user equipment.

In another optional implementation of this embodiment of this application, the transmission device may further buffer the first TCP packet after receiving the first data frame. In this case, the first TCP packet may be retransmitted when the user equipment fails to receive the first TCP packet, to ensure that the user equipment can receive the first TCP packet.

Specifically, a retransmission mechanism may be set between the transmission device and the user equipment.

For example, after sending the first TCP packet to the user equipment, the transmission device may retransmit the first TCP packet to the user equipment when receiving a preset quantity of DACK packets sent by the user equipment.

The user equipment may periodically send a DACK packet when the user equipment fails to receive the first TCP packet. When receiving the preset quantity of DACK packets, the transmission device may determine that the user equipment fails to receive a TCP packet. In this case, the TCP packet may be retransmitted to the user equipment. The preset quantity may be set to 3.

For another example, after the transmission device sends the first TCP packet to the user equipment, the transmission device may retransmit the first TCP packet to the user equipment when a target TCP ACK packet sent by the user equipment is not received within the preset time period.

The target TCP ACK packet indicates that the first TCP packet is already received by the user equipment. The user equipment feeds back the target TCP ACK packet in time when receiving the first TCP packet. Therefore, if the transmission device fails to receive a TCP ACK packet within the preset time period, it may indicate that the user equipment fails to receive a TCP packet. In this case, the transmission device may retransmit the first TCP packet to the user equipment. A length of the preset time period may be set based on an actual scenario.

It should be noted that, after the transmission device sends the first TCP packet to the user equipment, when receiving the target TCP ACK packet sent by the user equipment, the transmission device may acknowledge that the first TCP packet is already received by the user equipment. In this case, the buffered first TCP packet may be deleted.

In this embodiment of this application, to avoid an error during buffering of the first TCP packet, the transmission device may further store information about the TCP connection for transmitting the first TCP packet, for example, IP addresses and port numbers of the network device and the user equipment. In addition, when the first TCP packet is being buffered, the sequence number of the first TCP packet, a sequence number of a packet in which the first TCP packet is encapsulated, and the like are stored. The foregoing information is stored to uniquely identify a TCP packet, to avoid an error during buffering or retransmission of the first TCP packet.

It should be noted that there is no strict time sequence of performing step S704 and step S705.

S706: After receiving the BA frame, the gateway device determines information about the first TCP packet based on the BA frame.

After receiving the BA frame, the gateway device may acknowledge that the first data frame is already received by the transmission device, and the first TCP packet is encapsulated in the first data frame. Because there is a wired connection between the user equipment and the transmission device, data transmission is relatively reliable, and a possibility of a packet loss is relatively low. Therefore, it may be acknowledged that the first TCP packet is already received by the user equipment. The gateway device may determine the information about the first TCP packet based on the BA frame, to construct the first TCP ACK packet used to acknowledge that the first TCP packet is already received by the user equipment.

Specifically, in step S703, the gateway device may store a sequence number of the first data frame sent to the transmission device, the information about the first TCP packet, and a correspondence between the sequence number of the first data frame and the information about the first TCP packet. In this step, the gateway device may obtain, based on information in the BA frame, a sequence number of a data frame acknowledged by the BA frame, to be specific, the sequence number of the first data frame, and then may determine, based on the sequence number of the first data frame and the correspondence, the information about the first TCP packet encapsulated in the first data frame.

S707: The gateway device constructs a first TCP ACK packet based on the information about the first TCP packet.

The first TCP ACK packet is used to acknowledge that the first TCP packet is already received by the user equipment. The gateway device may construct the first TCP ACK packet based on the information about the first TCP packet, and the transmission device does not need to send the first TCP ACK packet, thereby reducing an amount of data to be transmitted in the wireless network.

The user equipment usually notifies the network device of the receive window value of the user equipment by carrying the receive window value of the user equipment to a TCP ACK packet. Therefore, when constructing the first TCP ACK packet, the gateway device may further carry the receive window value of the user equipment in the first TCP ACK packet, to be specific, the first receive window value in the BA frame.

In another optional implementation of this embodiment of this application, the transmission device may send a changed receive window value by using the BA frame only when the receive window value changes. Therefore, the gateway device may store the receive window value when receiving, for the first time, a BA frame including the receive window value. When a TCP ACK packet is constructed after another BA frame is subsequently received, it is determined whether the BA frame includes the receive window value. If the BA frame includes the receive window value, it indicates that the receive window value of the user equipment changes. In this case, the TCP ACK packet needs to be constructed based on the receive window value included in the BA frame. If the BA frame does not include the receive window value, it indicates that the receive window value of the user equipment does not change. In this case, the TCP ACK packet needs to be constructed based on a receive window value stored in the gateway device. In addition, when the BA frame includes the receive window value, the receive window value stored in the gateway device is updated to the receive window value included in the BA frame, to ensure accuracy of the receive window value stored in the gateway device.

Specifically, in this step, after receiving the BA frame, the gateway device may determine whether the BA frame includes the first receive window value. If the BA frame includes the first receive window value, the first receive window value is carried in the first TCP ACK packet, and the receive window value stored in the gateway device is updated to the first receive window value included in the BA frame; or if the BA frame does not include the first receive window value, the receive window value stored in the gateway device is carried in the first TCP ACK packet.

It should be noted that all receive window values stored in the gateway device are obtained by the gateway device from the received BA frame sent by the transmission device.

S708: The gateway device sends the constructed first TCP ACK packet to the network device.

After constructing the first TCP ACK packet, the gateway device sends the constructed first TCP ACK packet to the network device, so that the network device can acknowledge that the first TCP packet is already received by the user equipment. In addition, when the first TCP ACK packet includes the receive window value of the user equipment, the receive window value of the user equipment is determined based on the first TCP ACK packet.

In this embodiment of this application, after receiving, through a wireless connection, a data frame that is sent by the gateway device and in which a TCP packet is encapsulated, the transmission device sends a BA frame including a receive window value to the gateway device. After receiving a BA frame used to acknowledge that the data frame is already received by the user equipment, the gateway device may determine, based on the BA frame, information about the TCP packet encapsulated in the data frame, so that a TCP ACK packet used to acknowledge that the TCP packet is already received by the user equipment can be constructed, and the constructed TCP ACK packet is sent to the network device. In this way, after receiving the BA frame, the gateway device may construct the TCP ACK packet used to acknowledge that the TCP packet is already received by the user equipment, and send the TCP ACK packet to the network device. Therefore, the transmission device does not need to send the TCP ACK packet to the gateway device after sending the BA frame, and the gateway device may also construct the TCP ACK packet and send the TCP ACK packet to the network device, to complete a retransmission acknowledgment mechanism. In this way, an amount of data to be transmitted through a wireless connection between the gateway device and the transmission device is reduced, thereby improving performance of TCP data transmission.

Figure 8:
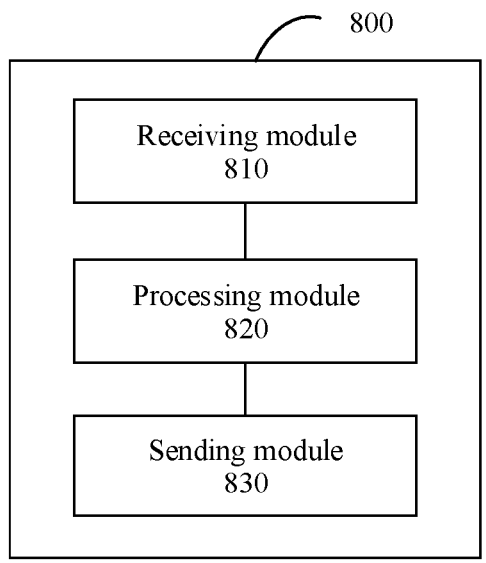
FIG. 8 is a schematic structural diagram 1 of a data transmission apparatus according to this application.

FIG. 8 is a schematic structural diagram 1 of a data transmission apparatus according to this application. As shown in FIG. 8, a data transmission apparatus 800 provided in this embodiment of this application may include a receiving module 810, a processing module 820, and a sending module 830.

In an implementation of this embodiment of this application, the data transmission apparatus 800 may be configured to perform the steps performed by the TE1 in the data transmission method shown in any one of the foregoing embodiments.

The processing module 820 is configured to: when determining that a first data stream satisfies a transmission optimization enabling condition, send a transmission optimization enabling notification to a first receiving end RE1 by using the sending module 830, where the first data stream is sent by a second transmitting end TE2 to a second receiving end RE2, the transmission optimization enabling notification is used to indicate the RE1 to skip sending, to the TE1, an acknowledgment packet used to acknowledge that a data packet of the first data stream is already received by the RE2, and the RE2 is the RE1 or the RE2 is a device communicating with the TE1 through the RE1.

The receiving module 810 is configured to: receive a data packet Data2 that is in a second protocol format and that is sent by the TE2, where the Data2 belongs to the first data stream; and receive an acknowledgment frame Ack1 that is in a first protocol format and that is sent by the RE1, where the Ack1 is used to acknowledge that a data frame Data1 in the first protocol format is already received by the RE1.

The sending module 830 is configured to: send the Data1 to the RE1 when the receiving module 810 receives the Data2, where the Data2 is encapsulated in the Data1; and when the receiving module 810 receives the Ack1, construct an acknowledgment packet Ack2 in the second protocol format based on the Ack1, and send the Ack2 to the TE2, where the Ack2 is used to acknowledge that the Data2 is already received by the RE2.

In a possible implementation of this implementation, the processing module 820 is further configured to buffer packet header information of the Data2 before the receiving module 810 receives the acknowledgment frame Ack1 that is in the first protocol format and that is sent by the RE1. When constructing the Ack2 based on the Ack1, the sending module 830 is specifically configured to: obtain the buffered Data2 based on the Ack1, and construct the Ack2 based on the packet header information of the buffered Data2.

In a possible implementation of this implementation, the transmission optimization enabling condition includes at least one of the following:

a transmission index of the first data stream is less than a preset transmission index threshold, where the transmission index includes at least one of the following: a sending rate and a packet loss rate; and a streaming service type of the first data stream is a multimedia stream.

In a possible implementation of this implementation, the first protocol is a wireless local area network WLAN protocol, and the second protocol is a connection-oriented transmission protocol.

In a possible implementation of this implementation, the TE2 is a network device, and the TE1 is a gateway device. For example, the network device may be a server, and the gateway device may be a home gateway.

In an example, if the RE2 is the RE1, the RE1 is user equipment; or if the RE2 is the device communicating with the TE1 through the RE1, the RE2 is user equipment, and the RE1 is a transmission device. For example, the transmission device may be an AP.

In a possible implementation of this implementation, the RE2 is the device communicating with the TE1 through the RE1, and the transmission optimization enabling notification is specifically used to instruct the RE1 to skip sending, an acknowledgment packet Ack3 to the TE1 when the RE1 receives the Ack3 that is in the second protocol format and that is sent by the RE2, where the Ack3 is used to acknowledge that the Data2 is already received by the RE2.

In a possible implementation of this implementation, the processing module 820 is further configured to: when determining that the first data stream satisfies the transmission optimization enabling condition, before sending the transmission optimization enabling notification to the first receiving end RE1 by using the sending module 830, determine whether transmission reliability between the RE1 and the RE2 satisfies a reliability requirement; and if yes, instruct the sending module 830 to send the transmission optimization enabling notification to the RE1 when determining that the first data stream satisfies the transmission optimization enabling condition.

In a possible implementation of this implementation, the first protocol may be a WLAN protocol, and the second protocol may be a TCP protocol.

Figure 9:
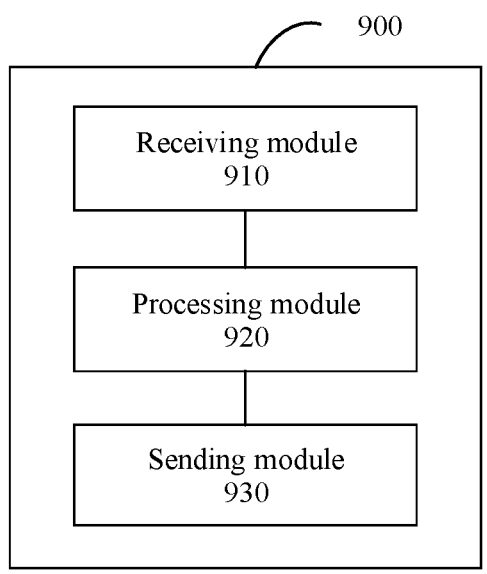
FIG. 9 is a schematic structural diagram 2 of a data transmission apparatus according to this application.
Figure 10:
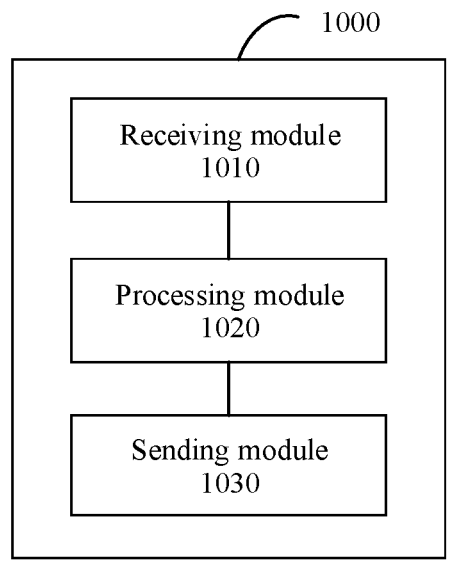
FIG. 10 is a schematic structural diagram 3 of a data transmission apparatus according to this application.
Figure 11:
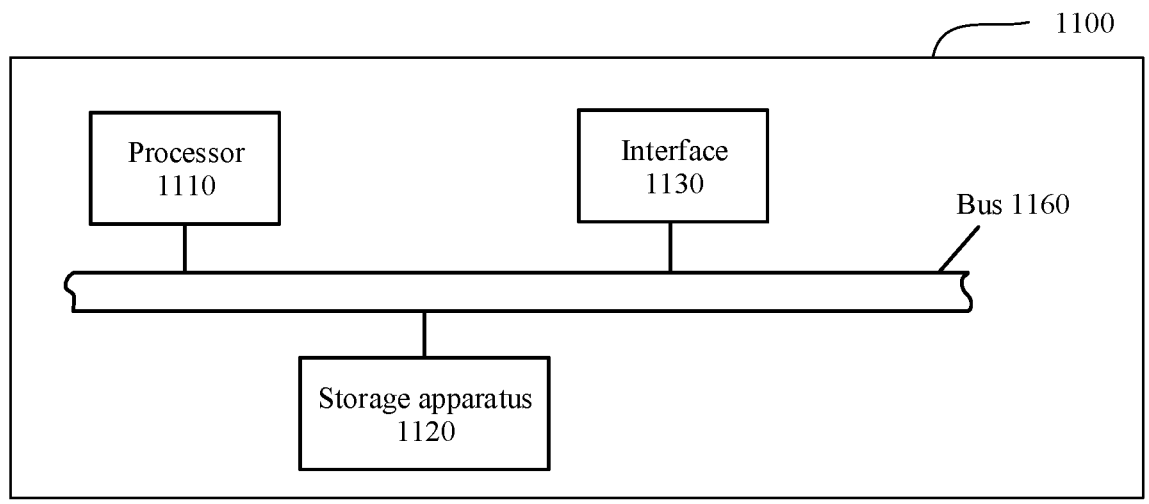
FIG. 11 is a schematic structural diagram of a gateway device according to this application.
Figure 12:
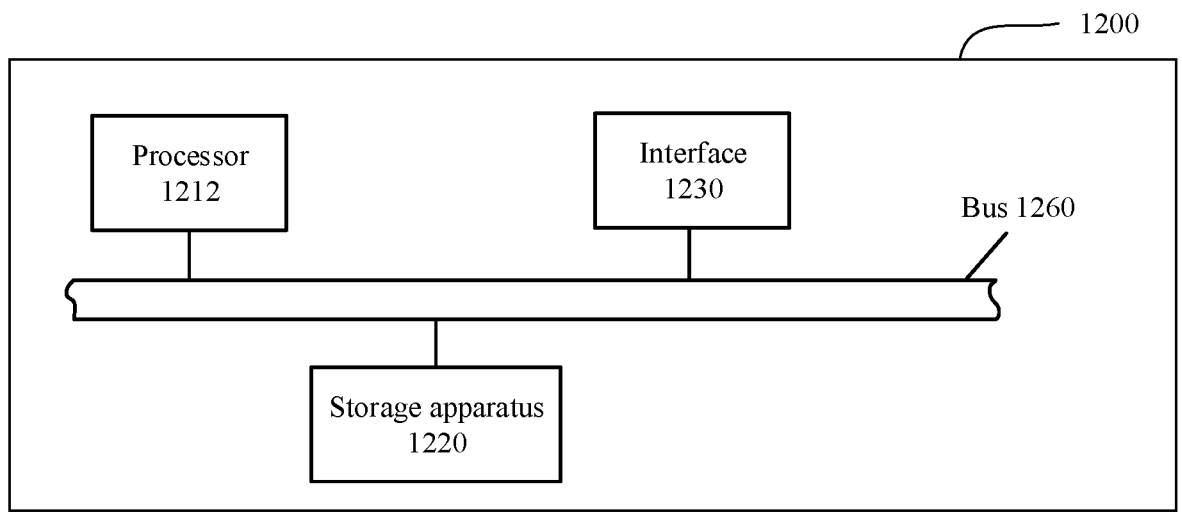
FIG. 12 is a schematic structural diagram of user equipment according to this application.
Figure 13:
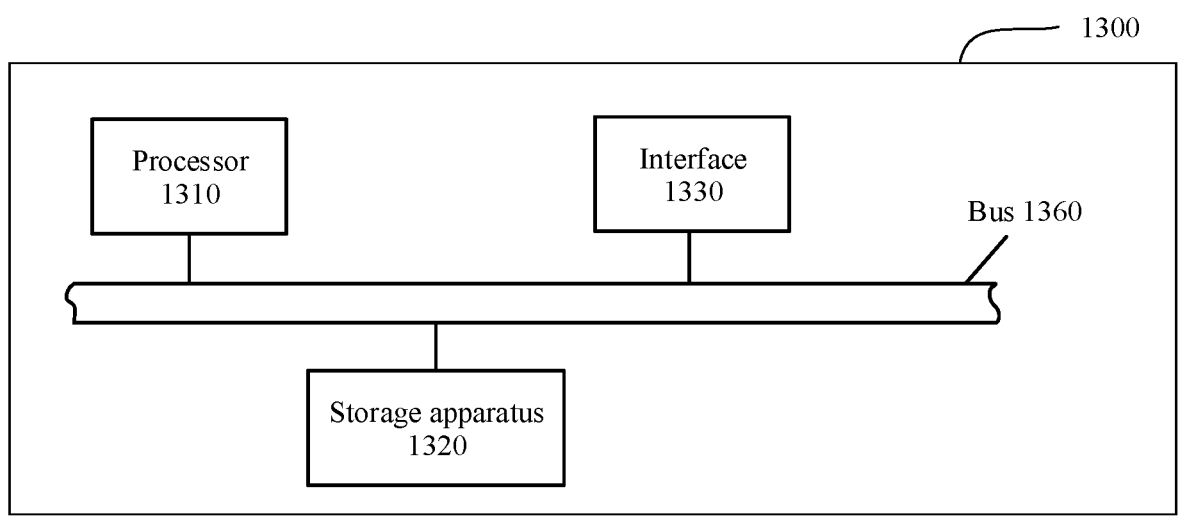
FIG. 13 is a schematic structural diagram of a transmission device according to this application.

FIG. 9 is a schematic structural diagram 2 of a data transmission apparatus according to this application. As shown in FIG. 9, a data transmission apparatus 900 provided in this embodiment of this application may include a receiving module 910, a processing module 920, and a sending module 930.

In an implementation of this embodiment of this application, the data transmission apparatus 900 may be configured to perform the steps performed by the RE0 in the data transmission method shown in any one of the foregoing embodiments.

The receiving module 910 is configured to: receive a transmission optimization enabling notification sent by a first transmitting end TE1, where the transmission optimization enabling notification is used to indicate the RE0 to skip sending, to the TE1 when the RE0 receives a data packet of a first data stream, a corresponding acknowledgment packet used to acknowledge that the data packet of the first data stream is already received by the RE0; and receive a data frame Data1 that is in a first protocol format and that is sent by the TE1, where a data packet Data2 in a second protocol format is encapsulated in the Data1, and the Data2 belongs to the first data stream.

The sending module 930 is configured to send an acknowledgment frame Ack1 in the first protocol format to the TE1 when the receiving module 910 receives the Data1, where the Ack1 is used to acknowledge that the Data1 is already received by the RE0.

The processing module 920 is configured to skip sending an acknowledgment packet Ack3 in the second protocol format to the TE1 based on the transmission optimization enabling notification, where the Ack3 is used to acknowledge that the Data2 is already received by the RE0.

In a possible implementation of this implementation, the RE0 further includes an upper-layer protocol module (not shown in the figure). In an example, the upper-layer protocol module may be a second protocol module or a second protocol processing module, for example, a TCP module. The first data stream is sent by the TE2 to the upper-layer protocol module, and the Ack3 is used to acknowledge that the Data2 is already received by the upper-layer protocol module.

The processing module 920 is further configured to send the Data2 to the upper-layer protocol module after the receiving module 910 receives the Data1 sent by the TE1.

The upper-layer protocol module is configured to send the Ack3 to the processing module after receiving the Data2.

The processing module 920 is further configured to: receive the Ack3 sent by the upper-layer protocol module, and discard the Ack3 based on the transmission optimization enabling notification.

The receiving module 910 is further configured to receive a data frame Data3 that is in the first protocol format and that is sent by the TE1, where a data packet Data4 in the second protocol format is encapsulated in the Data3, and the Data4 belongs to the first data stream.

The processing module 920 is further configured to: send the Data4 to the upper-layer protocol module; and when a first processing unit detects that the Data4 is not received by a second receiving unit, send a connection interruption instruction to the upper-layer protocol module, or send a connection interruption instruction to the TE2 by using the sending module 930, where the connection interruption instruction is used to instruct to disconnect a second protocol-based communication connection between the RE2 and the TE2.

In a possible implementation of this implementation, the receiving module 910, the processing module 920, and the sending module 930 may be lower-layer protocol modules.

In a possible implementation of this implementation, the TE1 is a gateway device, and the TE2 is a network device. For example, the gateway device may be a home gateway, and the network device may be a server.

In an example, the RE0 is user equipment, the RE1 is a WLAN module of the user equipment, and the RE2 is a TCP module of the user equipment. Correspondingly, the RE1 may communicate with the RE2 based on a bus inside a device. Alternatively, in another example, the RE1 is a transmission device, and the RE2 is user equipment. For example, the transmission device may be an AP. Correspondingly, the RE1 may communicate with the RE2 based on a wired communication link.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

What is claimed is:

1. A data transmission method comprising:
sending, by a first transmitting end (TE1) in response to a determination that a first data stream satisfies a transmission optimization enabling condition, a transmission optimization enabling notification to a first receiving end (RE1), wherein the transmission optimization enabling notification indicates the RE1 to skip sending, to the TE1, an acknowledgment packet used to acknowledge that a data packet of the first data stream is already received by a second receiving end (RE2);
receiving, by the TE1, a data packet (Data2) that is in a second protocol format and that is sent by the a second transmitting end (TE2), wherein the Data2 belongs to the first data stream;
sending, by the TE1, a data frame (Data1) in a first protocol format to the RE1, wherein the Data2 is encapsulated in the Data1;
receiving, by the TE1, an acknowledgment frame (Ack1) that is in the first protocol format and that is sent by the RE1, wherein the Ack1 is used to acknowledge that the Data1 is already received by the RE1; and
constructing, by the TE1, an acknowledgment packet (Ack2) in the second protocol format based on the Ack1, and sending the Ack2 to the TE2, wherein the Ack2 is used to acknowledge that the Data2 is already received by the RE2.

2. The method according to claim 1, wherein before receiving the Ack1, the method further comprises: buffering, by the TE1, packet header information of the Data2; and
wherein the constructing the Ack2 comprises: obtaining, by the TE1, the buffered Data2 based on the Ack1, and constructing the Ack2 based on the packet header information of the buffered Data2.

3. The method according to claim 1, wherein the transmission optimization enabling condition comprises at least one of the following:
a transmission index of the first data stream is less than a preset transmission index threshold, wherein the transmission index comprises at least one of the following: a sending rate and a packet loss rate; and
a streaming service type of the first data stream is a multimedia stream.

4. The method according to claim 1, wherein the RE2 is the device communicating with the TE1 through the RE1, and the transmission optimization enabling notification indicates the RE1 to skip sending an acknowledgment packet (Ack3) to the TE1 in response to the RE1 receiving the Ack3 that is in the second protocol format and that is sent by the RE2, wherein the Ack3 is used to acknowledge that the Data2 is already received by the RE2.

5. The method according to claim 4, wherein before sending the transmission optimization enabling notification to the RE1, the method further comprises:
determining, by the TE1, whether transmission reliability between the RE1 and the RE2 satisfies a reliability requirement; and
in response to the reliability requirement being satisfied, sending, by the TE1, the transmission optimization enabling notification to the RE1 based on the determination that the first data stream satisfies the transmission optimization enabling condition.

6. A data transmission method comprising:
receiving, by a first receiving end (RE1), a transmission optimization enabling notification sent by a first transmitting end (TE1), wherein the transmission optimization enabling notification indicates the RE1 to skip sending, to the TE1, an acknowledgment packet used to acknowledge that a data packet of a first data stream is already received by a second receiving end (RE2), and the first data stream is sent by a second transmitting end (TE2) to the RE2;
receiving, by the RE1, a data frame (Data1) that is in a first protocol format and that is sent by the TE1, wherein a data packet (Data2) in a second protocol format is encapsulated in the Data1, and the Data2 belongs to the first data stream;
sending, by the RE1, the Data2 to the RE2; and
in response to the RE1 receiving an acknowledgment packet Ack3 that is in the second protocol format and that is sent by the RE2, skipping sending, by the RE1, the Ack3 to the TE1 based on the transmission optimization enabling notification, wherein the Ack3 is used to acknowledge that the Data2 is already received by the RE2.

7. The method according to claim 6, wherein the skipping sending the Ack3 to the TE1 based on the transmission optimization enabling notification comprises: discarding, by the RE1, the Ack3.

8. The method according to claim 6, wherein after the sending, by the RE1, the Data2 to the RE2, the method further comprises:
receiving, by the RE1, a data frame (Data3) that is in the first protocol format and that is sent by the TE1, wherein a data packet (Data4) in the second protocol format is encapsulated in the Data3, and the Data4 belongs to the first data stream; and
sending, by the RE1, the Data4 to the RE2, and sending, by the RE1 to the RE2 or the TE2, a connection interruption instruction in response to the RE1 detecting that the Data4 is not received by the RE2, wherein the connection interruption instruction is used to instruct to disconnect a second protocol-based communication connection between the RE2 and the TE2.

9. The method according to claim 8, wherein that the RE1 detects that the Data4 is not received by the RE2 comprises:
receiving, by the RE1, a packet loss indication sent by the RE2, or failing to receive, by the RE1 within a preset time, an acknowledgment packet used to acknowledge that the Data4 is already received by the RE2.

10. A data transmission apparatus, wherein the apparatus is located at a first transmitting end (TE1) and comprises:
a processor; and
a non-transitory computer-readable storage medium coupled to the processor and storing programming instructions for execution by the processor, the programming instructions when executed by the processor instruct the apparatus to:
in response to determining that a first data stream satisfies a transmission optimization enabling condition, send a transmission optimization enabling notification to a first receiving end (RE1), wherein the transmission optimization enabling notification indicates the RE1 to skip sending, to the TE1, an acknowledgment packet used to acknowledge that a data packet of the first data stream is already received by the RE2;

receive a data packet (Data2) that is in a second protocol format and that is sent by a second transmitting end (TE2), wherein the Data2 belongs to the first data stream; and receive an acknowledgment frame Ack1 that is in a first protocol format and that is sent by the RE1, wherein the Ack1 is used to acknowledge that a data frame (Data1) in the first protocol format is already received by the RE1; and send the Data1 to the RE1 when receiving the Data2, wherein the Data2 is encapsulated in the Data1; and when receiving the Ack1, construct an acknowledgment packet Ack2 in the second protocol format based on the Ack1 and send the Ack2 to the TE2, wherein the Ack2 is used to acknowledge that the Data2 is already received by the RE2.

11. The apparatus according to claim 10, wherein the programming instructions further instruct the apparatus to:

before receiving the Ack1, buffer packet header information of the Data2; and when constructing the Ack2 based on the Ack1, obtain the buffered Data2 based on the Ack1, and construct the Ack2 based on the packet header information of the buffered Data2.

12. The apparatus according to claim 10, wherein the RE2 is the device communicating with the TE1 through the RE1, and the transmission optimization enabling notification indicates the RE1 to skip sending an acknowledgment packet Ack3 to the TE1 when the RE1 receives the Ack3 that is in the second protocol format and that is sent by the RE2, wherein the Ack3 is used to acknowledge that the Data2 is already received by the RE2.

13. The apparatus according to claim 12, wherein the programming instructions further instruct the apparatus to:

when determining that the first data stream satisfies the transmission optimization enabling condition, and before sending the transmission optimization enabling notification to the RE1, determine whether transmission reliability between the RE1 and the RE2 satisfies a reliability requirement; and if the reliability requirement is satisfied, sending the transmission optimization enabling notification to the RE1 based on the determination that the first data stream satisfies the transmission optimization enabling condition.

14. A data transmission apparatus, wherein the apparatus is located at a first receiving end (RE1) and comprises:

a processor; and a non-transitory computer-readable storage medium coupled to the processor and storing programming instructions for execution by the processor, the programming instructions when executed by the processor instruct the apparatus to:

receive a transmission optimization enabling notification sent by a first transmitting end (TE1), wherein the transmission optimization enabling notification indicates the RE1 to skip sending, to the TE1, an acknowledgment packet used to acknowledge that a data packet of a first data stream is already received by a second receiving end (RE2), and the first data stream is sent by a second transmitting end (TE2) to the RE2; and receive a data frame (Data1) that is in a first protocol format and that is sent by the TE1, wherein a data packet (Data2) in a second protocol format is encapsulated in the Data1, and the Data2 belongs to the first data stream;

send the Data2 to the RE2 when receiving the Data1; and when receiving an acknowledgment packet (Ack3) that is in the second protocol format and that is sent by the RE2, skip sending the Ack3 to the TE1 based on the transmission optimization enabling notification, wherein the Ack3 is used to acknowledge that the Data2 is already received by the RE2.

15. The apparatus according to claim 14, wherein the programming instructions further instruct the apparatus to:

receive a data frame (Data3) that is in the first protocol format and that is sent by the TE1, wherein a data packet (Data4) in the second protocol format is encapsulated in the Data3, and the Data4 belongs to the first data stream; and send the Data4 to the RE2, and when detecting that the Data4 is not received by the RE2, send a connection interruption instruction to the RE2 or the TE2, wherein the connection interruption instruction instructs to disconnect a second protocol-based communication connection between the RE2 and the TE2.

16. The apparatus according to claim 15, wherein the programming instructions further instruct the apparatus to:

determine that the Data4 is not received by the RE2 when receiving a packet loss indication sent by the RE2 or when fails to receive, within a preset time, an acknowledgment packet used to acknowledge that the Data4 is already received by the RE2.

* * * * *

UNITED STATES PATENT AND TRADEMARK OFFICE
CERTIFICATE OF CORRECTION

PATENT NO. : 11,785,120 B2
APPLICATION NO. : 17/375806
DATED : October 10, 2023
INVENTOR(S) : Zhang et al.

It is certified that error appears in the above-identified patent and that said Letters Patent is hereby corrected as shown below:

In the Claims

Claim 1: Column 37, Line 21: "second protocol format and that is sent by the a second" should read -- second protocol format and that is sent by a second --.

Signed and Sealed this
Thirtieth Day of January, 2024

Katherine Kelly Vidal
*Director of the United States Patent and Trademark Office*